(12) United States Patent
Ito et al.

(10) Patent No.: US 6,702,176 B2
(45) Date of Patent: Mar. 9, 2004

(54) SOLDER, METHOD FOR PROCESSING SURFACE OF PRINTED WIRING BOARD, AND METHOD FOR MOUNTING ELECTRONIC PART

(75) Inventors: Toshihide Ito, Toyama (JP); Shiro Hara, Aichi (JP)

(73) Assignees: NEC Toppan Circuit Solutions, INC, Tokyo (JP); Solder Coat Co., Ltd., Aichi (JP)

(*) Notice: Subject to any disclaimer, the term of this patent is extended or adjusted under 35 U.S.C. 154(b) by 54 days.

(21) Appl. No.: 10/011,808

(22) Filed: Dec. 11, 2001

(65) Prior Publication Data

US 2002/0117539 A1 Aug. 29, 2002

(30) Foreign Application Priority Data

Dec. 11, 2000 (JP) .................... 2000-375960
Feb. 9, 2001 (JP) .................... 2001-034319

(51) Int. Cl.[7] .................... B23K 31/02; C22C 13/00
(52) U.S. Cl. .................... 228/180.21; 228/254; 420/560
(58) Field of Search .................... 228/179.1, 180.1, 228/180.21, 180.22, 245–262; 420/557, 560

(56) References Cited

U.S. PATENT DOCUMENTS 6,109,506 A * 8/2000 Blair et al.
6,231,691 B1 * 5/2001 Anderson et al.

FOREIGN PATENT DOCUMENTS

| DE | 198 16 671 A1 | 10/1998 |
|---|---|---|
| EP | 0 715 927 A1 | 6/1996 |
| EP | 0 847 829 A1 | 6/1998 |
| JP | 55020403 * | 2/1980 |
| JP | 2-34295 | 2/1990 |
| JP | 2-179388 | 7/1990 |
| JP | 4-333391 | 11/1992 |
| JP | 6-269983 | 9/1994 |
| JP | 9-94688 | 4/1997 |
| JP | 11-77366 | 3/1999 |
| JP | 11-216591 | 8/1999 |

OTHER PUBLICATIONS

US 2002/0131887A1 Takaoka et al. (Sep. 19, 2002).*
US 2002/0127136A1 Takaoka et al. (Sep. 12, 2002).*
US 2002/0192106A1 Takaoka et al. (Dec. 19, 2002).*
Translation of JP–11216591A.*
Patent Abstracts of Japan, vol. 1999, No. 13, Nov. 30, 1999 (corresponds to JPA No. 11–216591, published Aug. 10, 1999).
Patent Abstracts of Japan, vol. 018, No. 679, Dec. 21, 1994, (corresponds to JPA No. 6–269983, published Sep. 27, 1994).

* cited by examiner

Primary Examiner—Kiley Stoner
(74) Attorney, Agent, or Firm—Sughrue Mion, PLLC

(57) ABSTRACT

A solder consists essentially of 1.0% to 4.0% of Ag by mass, 0.2% to 1.3% of Cu by mass, 0.02% to 0.06% of Co by mass, and the remaining of Sn and inevitable impurities.

2 Claims, 9 Drawing Sheets

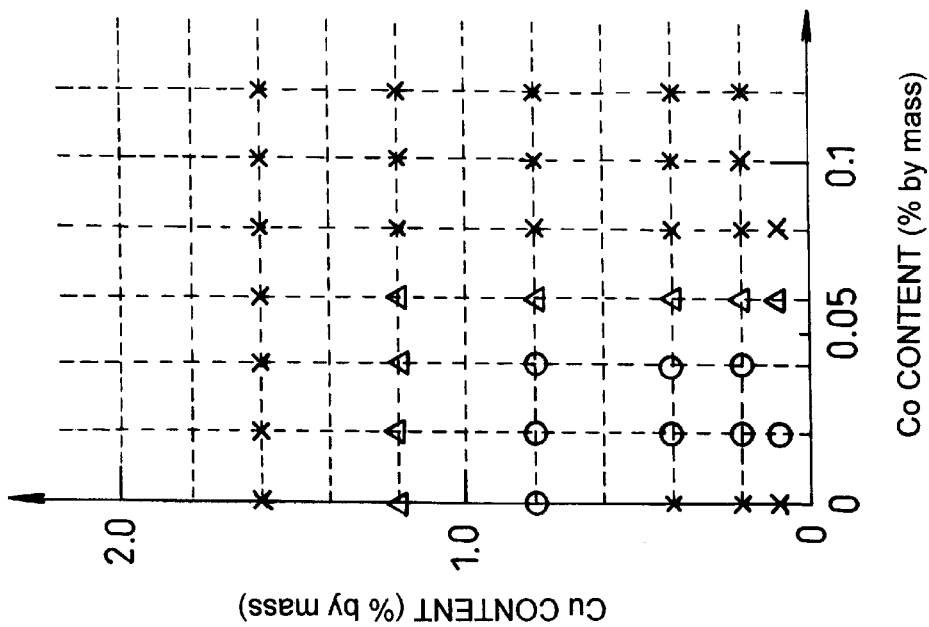
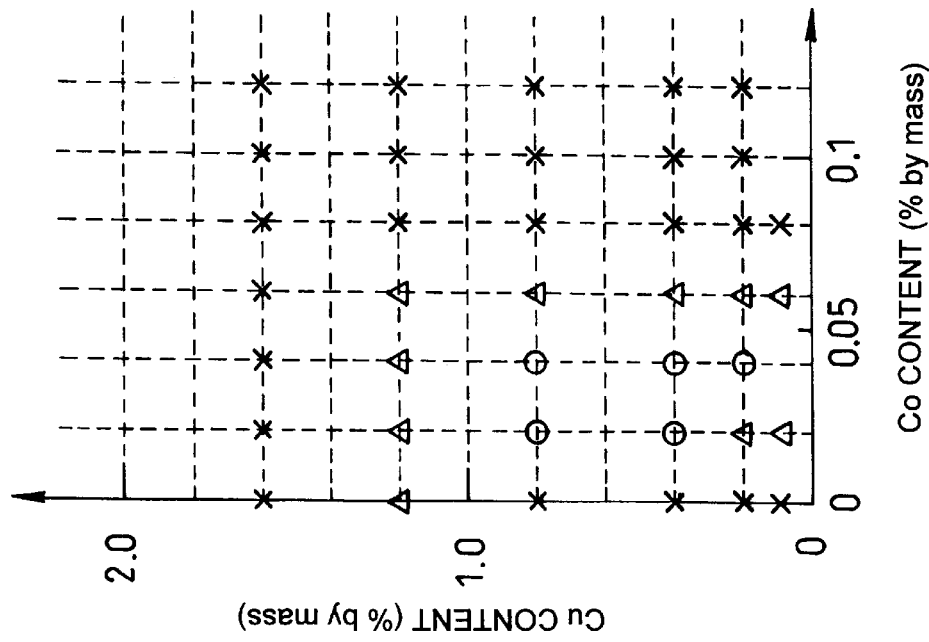

SOLDER, METHOD FOR PROCESSING SURFACE OF PRINTED WIRING BOARD, AND METHOD FOR MOUNTING ELECTRONIC PART

BACKGROUND OF THE INVENTION

1. Field of the Invention

The present invention relates to a Sn—Ag—Cu based solder, a method for processing a surface of a printed wiring board and a method for mounting an electronic part, in particular, to a solder, a method for processing a surface of a printed wiring board and a method for mounting an electronic part, wherein the prevention of copper consuming is achieved at the time of soldering.

2. Description of the Related Art

Conventionally an alloy of 63% of Sn and 37% of Pb by mass is utilized as a solder for coating a copper circuit on a printed wiring board and for the connection between a footprint or through holes in a printed wiring board and leads of parts to be mounted. Recently, however, environmental pollution due to lead that has eluted from discarded electronic equipment has become a problem and solder that does not include Pb has been under intense development in the manufacturing of electronic parts.

As for lead-free solder that does not include Pb, a Sn—Cu based alloy, a Sn—Ag—Cu based alloy and a Sn—Zn based alloy are representative and alloys gained by adding Bi, In and/or Ge to these alloys have also been under examination.

As for the Sn—Cu based alloy, however, even an alloy of 99.2% of Sn and 0.8% of Cu by mass, which is of the eutectic composition, has a comparatively high melting point of 227° C. and, therefore, there is a shortcoming wherein in the case that the composition is changed for the purpose of preventing the below described copper consuming, the melting point becomes higher so that the printed wiring board and electronic parts to be mounted cannot withstand high temperature at the time of soldering. The heat-resistant temperature of printed wiring boards in general use is approximately 260° C.

As for the Sn—Zn based alloy, the solder melting point of 91% of Sn and 9% of Zn by mass, which is of the eutectic composition, is 199° C., which is close to the melting point, 183° C., of the alloy of 63% of Sn and 37% of Pb by mass, which is of eutectic composition. Accordingly, this is an alloy that is favorable from the viewpoint of the melting point. However, since Zn is an active element, there is a shortcoming in that the solder is significantly oxidized so that it is difficult to achieve a good soldering condition.

As for the Sn—Ag—Cu based alloy, the three element eutectic alloy of 95.8% of Sn, 3.5% of Ag and 0.8% of Cu by mass has a melting point of 217° C., which is higher than the melting point of the alloy of 63% of Sn and 37% of Pb by mass and the Sn—Zn based alloy and is still low enough for use as solder from the viewpoint of the heat resistance of printed wiring board and the like. In addition, even in a case where the processing temperature for coating a copper circuit on a printed wiring board and for the connection between a footprint or through holes in a printed wiring board and leads of parts to be mounted is assumed to be 250° C., an excellent soldered condition can be gained, of which the mechanical characteristics are also excellent, and, therefore, the Sn—Ag—Cu based alloy is the most suitable for practical application from among the above described lead-free solders.

Sn—Ag—Cu based alloys are disclosed in, for example, Japanese Unexamined Patent Publication No. Hei 2-34295, Japanese Unexamined Patent Publication No. Hei 2-179388, Japanese Unexamined Patent Publication No. Hei 4-333391, Japanese Unexamined Patent Publication No. Hei 6-269983 and Japanese Unexamined Patent Publication No. Hei 11-77366. The solder disclosed in Japanese Unexamined Patent Publication No. Hei 2-34295 is for the purpose of providing a lead-free solder while the solder disclosed in Japanese Unexamined Patent Publication No. Hei 2-179388 is for the purpose of improving corrosion resistance and electrical and thermal conductivity. In addition, the solder disclosed in Japanese Unexamined Patent Publication No. Hei 4-333391 is for the purpose of increasing creep characteristics, the solder described in Japanese Unexamined Patent Publication No. Hei 6-269983 is for the purpose of increasing wettability on the Ni based base material and the solder described in Japanese Unexamined Patent Publication No. Hei 11-77366 is for the purpose of increasing strength against thermal fatigue strength and joint characteristics.

In a case where a Sn—Ag—Cu based alloy is utilized, however, there is a problem wherein when the alloy is coated on a copper circuit of a printed wiring board by means of a hot air leveling method, the copper plating layer of the printed wiring board is consumed so as to be thinner and in the worst case wiring may be cut. In addition, in a case where parts are soldered through flow soldering, the copper plating layer of the printed wiring board is consumed and becomes thinner so as to cause soldering defects.

Therefore, a solder gained by adding 1% to 4% of Cu by mass to a Sn—Sb—Bi—In based alloy has been proposed (Japanese Unexamined Patent Publication No. Hei 11-77368). In addition, a solder gained by adding 1% to 3% of Cu by mass to a Sn—Zn—Ni based alloy, which is a Sn—Zn based alloy, has also been proposed (Japanese Unexamined Patent Publication No. Hei 9-94688).

Both of the solders disclosed in these gazettes are designed to prevent copper consuming by adding Cu. The melting point of the former, however, is too high because the solidus temperature is 208° C. while the liquidus temperature is 342° C. Since the latter is a Sn—Zn based alloy, there is a problem concerning oxidation as described above.

Moreover, in Japanese Unexamined Patent Publication No. Hei 11-216591 data gained by actually carrying out the measurement of the alloys of 96% of Sn, 3.5% of Ag and 0.5% of Co by mass as well as 98.8% of Sn, 0.7% of Cu and 0.5% of Co by mass and the like are described under the assumption that the addition of Co can prevent copper consuming. However, even in a case where copper consuming can be prevented such compositions allow the liquidus temperatures to significantly increase so that it is difficult to apply electronic parts to usable products due to safety concerns.

SUMMARY OF THE INVENTION

It is an object of the present invention to provide a solder that can prevent copper consuming and of which the melting point is controlled to the extent where no damage to electronic parts occurs, a method for processing a surface of a printed wiring board on which the solder is utilized and a method for mounting an electronic part by utilizing the solder.

According to one aspect of the present invention, a solder consists essentially of 1.0% to 4.0% of Ag by mass, 0.2% to 1.3% of Cu by mass, 0.02% to 0.06% of Co by mass, and the remaining of Sn and inevitable impurities.

According to another aspect of the present invention, a solder consists essentially of 1.0% to 4.0% of Ag by mass, 0.2% to 1.3% of Cu by mass, 0.02% to 0.06% of Co by mass, 0.02% to 0.06% of Ni by mass, and the remaining of Sn and inevitable impurities.

According to further another aspect of the present invention, a solder consists essentially of 1.0% to 4.0% of Ag by mass, 0.2% to 1.3% of Cu by mass, 0.02% to 0.06% of Co by mass, 0.02% to 0.06% of Fe by mass, and the remaining of Sn and inevitable impurities.

According to still further aspect of the present invention, a solder consists essentially of 1.0% to 4.0% of Ag by mass, 0.2% to 1.3% of Cu by mass, 0.02% to 0.06% of Co by mass, 0.02% to 0.06% of Ni by mass, 0.02% to 0.06% of Fe by mass, and the remaining of Sn and inevitable impurities.

According to the present invention a minute amount of Co prevents copper consuming at the time of soldering. In addition, since the content thereof is of a minute amount, the solder has a composition close to the eutectic of the Sn—Ag—Cu based solder and, thereby, the increase in the liquidus temperature can be controlled. Furthermore, since the solder is a Sn—Ag—Cu based solder, a high wettability and a high spreadability can be secured. In the case where not only Co but, also, a minute amount of Ni and/or Fe is contained, the melting rate of copper can be lowered while controlling the increase in the liquidus temperature.

According to one aspect of the present invention, a method for processing a surface of a printed wiring board comprises the step of coating a circuit formed on a surface of a printed wiring board with a solder consisting essentially of 1.0% to 4.0% of Ag by mass, 0.2% to 1.3% of Cu by mass, 0.02% to 0.06% of Co by mass, and the remaining of Sn and inevitable impurities.

According to another aspect of the present invention, a method for processing a surface of a printed wiring board comprises the step of coating a circuit formed on a surface of a printed wiring board with a solder consisting essentially of 1.0% to 4.0% of Ag by mass, 0.2% to 1.3% of Cu by mass, 0.02% to 0.06% of Co by mass, 0.02% to 0.06% of Ni by mass, and the remaining of Sn and inevitable impurities.

According to further another aspect of the present invention, a method for processing a surface of a printed wiring board comprises the step of coating a circuit formed on a surface of a printed wiring board with a solder consisting essentially of 1.0% to 4.0% of Ag by mass, 0.2% to 1.3% of Cu by mass, 0.02% to 0.06% of Co by mass, 0.02% to 0.06% of Fe by mass, and the remaining of Sn and inevitable impurities.

According to still further another aspect of the present invention, a method for processing a surface of a printed wiring board comprises the step of coating a circuit formed on a surface of a printed wiring board with a solder consisting essentially of 1.0% to 4.0% of Ag by mass, 0.2% to 1.3% of Cu by mass, 0.02% to 0.06% of Co by mass, 0.02% to 0.06% of Ni by mass, 0.02% to 0.06% of Fe by mass, and the remaining of Sn and inevitable impurities.

According to one aspect of the present invention, a method for mounting an electronic part comprises the step of soldering an electronic part on a circuit formed on a surface of a printed wiring board with a solder consisting essentially of 1.0% to 4.0% of Ag by mass, 0.2% to 1.3% of Cu by mass, 0.02% to 0.06% of Co by mass, and the remaining of Sn and inevitable impurities.

According to another aspect of the present invention, a method for mounting an electronic part comprises the step of soldering an electronic part on a circuit formed on a surface of a printed wiring board with a solder consisting essentially of 1.0% to 4.0% of Ag by mass, 0.2% to 1.3% of Cu by mass, 0.02% to 0.06% of Co by mass, 0.02% to 0.06% of Ni by mass, and the remaining of Sn and inevitable impurities.

According to further anther aspect of the present invention, a method for mounting an electronic part comprises the step of soldering an electronic part on a circuit formed on a surface of a printed wiring board with a solder consisting essentially of 1.0% to 4.0% of Ag by mass, 0.2% to 1.3% of Cu by mass, 0.02% to 0.06% of Co by mass, 0.02% to 0.06% of Fe by mass, and the remaining of Sn and inevitable impurities.

According to still further another aspect of the present invention, a method for mounting an electronic part, comprises the step of soldering an electronic part on a circuit formed on a surface of a printed wiring board with a solder consisting essentially of 1.0% to 4.0% of Ag by mass, 0.2% to 1.3% of Cu by mass, 0.02% to 0.06% of Co by mass, 0.02% to 0.06% of Ni by mass, 0.02% to 0.06% of Fe by mass, and the remaining of Sn and inevitable impurities.

In accordance with these methods according to the present invention, a printed wiring board of high reliability can be gained regardless of whether or not an electronic part is mounted thereon.

BRIEF DESCRIPTION OF THE DRAWINGS

FIG. 2 is a diagram of Sn—Ag—Cu—Co(—Ni) showing the relationship between the Co content and the Cu content when the Ag content is fixed at 2% by mass, wherein FIG. 2A is in the case of Ni free, while FIG. 2B is in the case of containing 0.04% of Ni by mass;

FIG. 3 is a diagram of Sn—Ag—Cu—Co(—Ni) showing the relationship between the Co content and the Ag content when the Cu content is fixed at 0.8% by mass, wherein FIG. 3A is in the case of Ni free, while

FIG. 4A is a graph of Sn-2% Ag-0.8% Cu-0.04% Co—Ni showing the relationship between the Ni content and the liquidus temperature while

FIG. 6A is a graph of Sn-3.5% Ag-0.8% Cu-0.06% Co—Fe showing the relationship between the Fe content and the liquidus temperature while

FIG. 9A is a graph of Sn—Ag—Cu—Co showing the relationship between the Co content and the liquidus temperature in a solder of Sn, 3.5% of Ag by mass and 0.8% of Cu by mass while

DETAILED DESCRIPTION OF THE PREFERRED EMBODIMENTS

Figure 1:
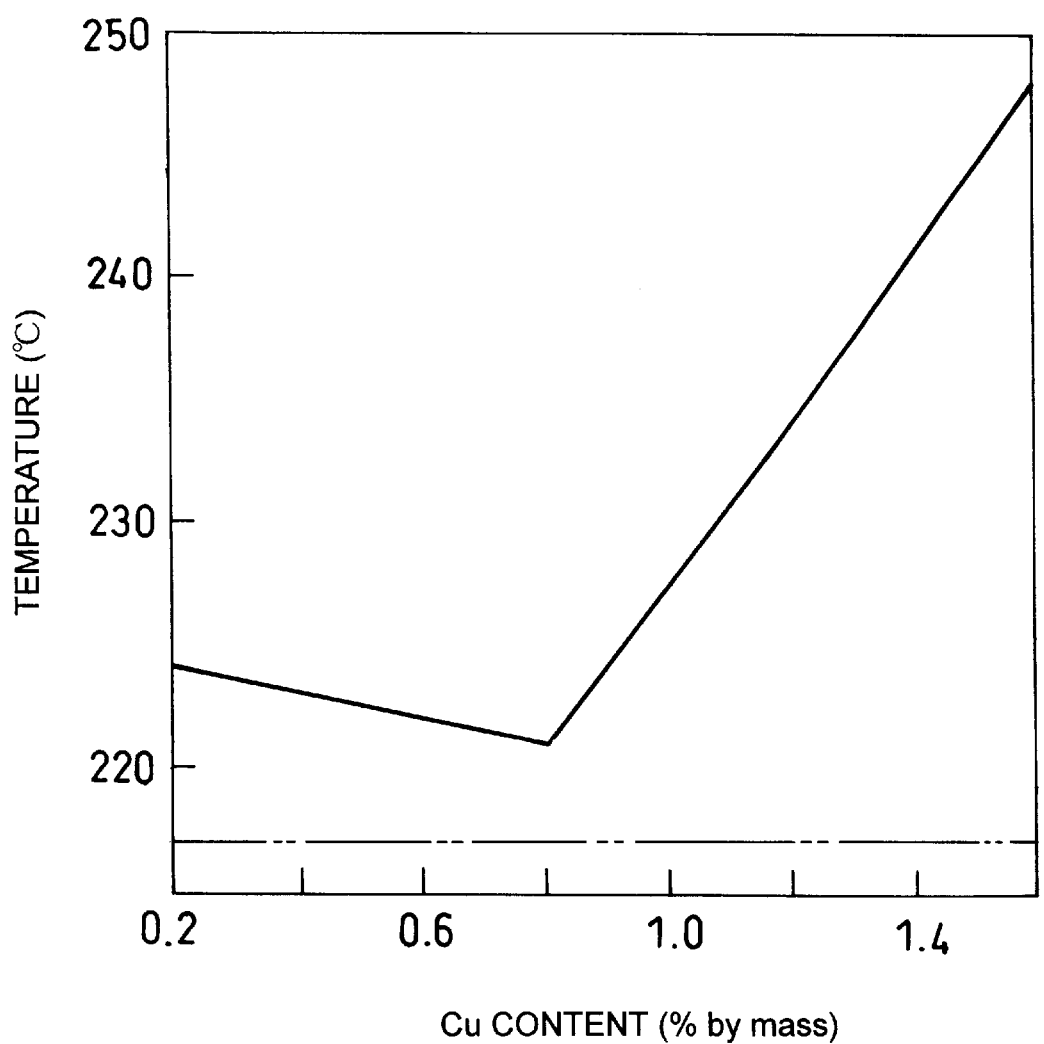
FIG. 1 is a phase diagram of an Sn-2% Ag—Cu-0.04% Co alloy with the Cu content indicated along the horizontal axis.

As a result of repeated and diligent experimental research by the inventors of the present application in order to solve the above described problems, it has been found that copper consuming can be prevented by adding a proper amount of Co while controlling the increase in the liquidus temperature, for example, by controlling the liquidus temperature at 230° C. or below, which is preferable in regard to the heat-resistant temperature of the printed wiring board and, in addition, this prevention effect can be increased by adding a proper amount of Ni and/or Fe. The melting rate of copper in a case wherein the inventors of the present application added a variety of elements to Sn is shown in the following Table 1. Table 1 shows that the higher the melting rate of copper is, the easier copper consuming progresses.

TABLE 1

| Composition (% by mass) | | | | | | | | | Melting rate of copper |
|---|---|---|---|---|---|---|---|---|---|
| Sn | Ag | Cu | Bi | In | Zn | Fe | Ni | Co | (μm/sec) |
| 100 | 0 | 0 | 0 | 0 | 0 | 0 | 0 | 0 | 0.61 |
| 98.8 | 1.2 | 0 | 0 | 0 | 0 | 0 | 0 | 0 | 0.41 |
| 96.5 | 3.5 | 0 | 0 | 0 | 0 | 0 | 0 | 0 | 0.27 |
| 99.6 | 0 | 0.4 | 0 | 0 | 0 | 0 | 0 | 0 | 0.43 |
| 99.2 | 0 | 0.8 | 0 | 0 | 0 | 0 | 0 | 0 | 0.29 |
| 98.8 | 0 | 1.2 | 0 | 0 | 0 | 0 | 0 | 0 | 0.17 |
| 98 | 0 | 0 | 2 | 0 | 0 | 0 | 0 | 0 | 0.50 |
| 96 | 0 | 0 | 4 | 0 | 0 | 0 | 0 | 0 | 0.42 |
| 92 | 0 | 0 | 8 | 0 | 0 | 0 | 0 | 0 | 0.32 |
| 98 | 0 | 0 | 0 | 2 | 0 | 0 | 0 | 0 | 0.47 |
| 96 | 0 | 0 | 0 | 4 | 0 | 0 | 0 | 0 | 0.38 |
| 92 | 0 | 0 | 0 | 8 | 0 | 0 | 0 | 0 | 0.29 |
| 99 | 0 | 0 | 0 | 0 | 1 | 0 | 0 | 0 | 0.20 |
| 98 | 0 | 0 | 0 | 0 | 2 | 0 | 0 | 0 | 0.06 |
| 96 | 0 | 0 | 0 | 0 | 4 | 0 | 0 | 0 | 0.02 |
| 91 | 0 | 0 | 0 | 0 | 9 | 0 | 0 | 0 | 0.01 |
| 99.98 | 0 | 0 | 0 | 0 | 0 | 0.02 | 0 | 0 | 0.52 |
| 99.96 | 0 | 0 | 0 | 0 | 0 | 0.04 | 0 | 0 | 0.46 |
| 99.94 | 0 | 0 | 0 | 0 | 0 | 0.06 | 0 | 0 | 0.41 |
| 99.98 | 0 | 0 | 0 | 0 | 0 | 0 | 0.02 | 0 | 0.45 |
| 99.96 | 0 | 0 | 0 | 0 | 0 | 0 | 0.04 | 0 | 0.35 |
| 99.94 | 0 | 0 | 0 | 0 | 0 | 0 | 0.06 | 0 | 0.26 |
| 99.98 | 0 | 0 | 0 | 0 | 0 | 0 | 0 | 0.02 | 0.4 |
| 99.96 | 0 | 0 | 0 | 0 | 0 | 0 | 0 | 0.04 | 0.3 |
| 99.94 | 0 | 0 | 0 | 0 | 0 | 0 | 0 | 0.06 | 0.25 |

As shown in the above Table 1, in a case where a minute amount of Co, Ni or Fe is added, the melting rate of copper is significantly reduced in comparison with cases where other elements are added. In particular, the reduction of the melting rate of copper is significant at the time when Co, from among these three types of elements, is added. In general, as the amount of other elements added to an alloy that has a eutectic composition increases, the liquidus temperature increases and in the case where the amount of the addition is minute, the increase in the liquidus temperature can be limited to the minimum. Accordingly, it is considered that by adding a minute amount of Co, Ni and/or Fe, copper consuming can be prevented while controlling the increase in the liquidus temperature.

In the following, the chemical components contained in solders according to the present invention and the reason why the solders are limited to such compositions are described.

Ag: 1.0% to 4.0% by Mass

Ag is an element that has the effect of increasing the wettability of solder. That is to say, by adding Ag, the time that the solder is to be wet can be shortened. The results of measuring the wettability of solders of Sn—Ag—Cu based alloys by means of a wetting balance method prescribed in Clause 8.3.1.2 of JIS Z 3197 are shown in the following Table 2. In this test, a phosphorous-deoxidized copper plate, of which the thickness is 0.3 mm, the width is 5 mm, and the length is 50 mm was utilized as a test piece after being heated for 20 minutes at 130° C. so as to be oxidized. In addition, a solution gained by adding and dissolving 0.39±0.01 g of diethylamine hydrochloride into a solution gained by dissolving 25 g of rosin as flux into isopropyl alcohol was utilized. The temperature of the solder bath was 250° C., the rate of immersion into the solder bath was 16 mm/sec, the depth of immersion was 2 mm and the time of immersion was 10 sec.

TABLE 2

| Composition (% by mass) | | | Solidus temperature (° C.) | Liquidus temperature (° C.) | Melting rate of copper (μm/sec) | Wetted time (sec) |
|---|---|---|---|---|---|---|
| Sn | Ag | Cu | | | | |
| 100 | 0 | 0 | 232 | 232 | 0.61 | 5.42 |
| 99.6 | 0 | 0.4 | 227 | 230 | 0.43 | 2.37 |
| 99.2 | 0 | 0.8 | 227 | 227 | 0.29 | 2.2 |
| 98.8 | 0 | 1.2 | 227 | 244 | 0.17 | 2.22 |
| 98.4 | 0 | 1.6 | 227 | 259 | 0.04 | 2.96 |
| 98.8 | 1.2 | 0 | 221 | 228 | 0.41 | 1.4 |
| 98.4 | 1.2 | 0.4 | 217 | 226 | 0.30 | 1.55 |
| 98 | 1.2 | 0.8 | 217 | 224 | 0.19 | 1.49 |
| 97.6 | 1.2 | 1.2 | 217 | 237 | 0.13 | 1.73 |
| 97.2 | 1.2 | 1.6 | 217 | 253 | 0.07 | 3.48 |
| 96.5 | 3.5 | 0 | 221 | 221 | 0.27 | 1.43 |
| 96.1 | 3.5 | 0.4 | 217 | 219 | 0.18 | 1.24 |
| 95.7 | 3.5 | 0.8 | 217 | 217 | 0.13 | 1.16 |
| 95.3 | 3.5 | 1.2 | 217 | 226 | 0.08 | 1.41 |
| 94.9 | 3.5 | 1.6 | 217 | 242 | 0.04 | 2.97 |

As shown in Table 2, the amount of time that a solder, of Sn—Cu based alloys to which Ag is not added, was to be wet exceeded 2 sec in all cases while the amount of time that a solder, of a Sn-1.2% Ag—Cu based alloy or of a Sn-3.5Ag—Cu based alloy to which Ag is added, was to be wet was within 2 sec in most cases.

Here, in the case where the content of Ag in the solder is less than 1.0% by mass, the above described effect of a shortened wetted time cannot be gained. On the other hand, when the Ag content exceeds 4.0% by mass, the liquidus temperature becomes high so that there is a risk that a defect will occur to a printed wiring board and to electronic parts at the time of soldering. Accordingly, the content of Ag in the solder should be in a range of 1.0% to 4.0% by mass.

Cu: 0.2% to 1.3% by Mass

Cu is an element that has the effect of preventing copper consuming of a copper circuit on a printed wiring board. The characteristics of JIS H63A solder that is a Sn—Pb eutectic solder and to which Cu is added are shown in the following Table 3.

TABLE 3

| Cu content (% by mass) | Solidus temperature (° C.) | Liquidus temperature (° C.) | Melting rate of copper (μm/sec) |
|---|---|---|---|
| 0 | 183 | 183 | 0.10 |
| 0.1 | 183 | 183 | 0.08 |
| 0.2 | 183 | 198 | 0.07 |
| 0.3 | 183 | 218 | 0.05 |
| 0.4 | 183 | 236 | 0.04 |
| 0.5 | 183 | 250 | 0.02 |

As shown in Table 3, as the Cu content increases, the melting rate of copper is lowered so as to prevent copper consuming. On the other hand, the liquidus temperature increases.

In the case where the content of Cu in the solder is less than 0.2% by mass, the above-described effect of preventing copper consuming is insufficient. On the other hand, when the Cu content exceeds 1.3% by mass, the liquidus temperature becomes high so that there is a risk that a defect will occur to the printed wiring board and to the electronic parts at the time of soldering. FIG. 1 is a phase diagram of an alloy of Sn-2% Ag—Cu-0.04% Co, with the Cu content indicated along the horizontal axis. In FIG. 1, the solid line shows the liquidus temperature and the double dotted chain line shows the solidus temperature. For example, in the case of an alloy of Sn-2% Ag—Cu-0.04% Co, when the Cu content exceeds 1.3% by mass, the liquidus temperature exceeds 240° C. as shown in FIG. 1. Accordingly, the content of Cu in the solder is in a range of 0.2% to 1.3% by mass.

The relationships between Ag and Cu contents and the liquidus temperature (° C.) and the melting rate of copper (μm/sec) in an Sn—Ag—Cu based solder are shown in the following Tables 4 and 5, respectively. In these solders the remaining components are all Sn.

TABLE 4

| Liquidus temperature (° C.) | Cu content (% by mass) | | | | | | |
|---|---|---|---|---|---|---|---|
| | | 0 | 0.2 | 0.4 | 0.8 | 1 | 1.2 | 1.6 |
| Ag content (% by mass) | 0 | 232 | 230 | 229 | 227 | 235 | 244 | 259 |
| | 0.5 | 231 | 230 | 228 | 226 | 233 | 241 | 257 |
| | 1 | 229 | 228 | 227 | 225 | 231 | 238 | 254 |
| | 2 | 226 | 225 | 224 | 222 | 227 | 233 | 249 |
| | 3 | 222 | 222 | 221 | 219 | 224 | 228 | 244 |
| | 3.5 | 221 | 220 | 219 | 217 | 222 | 226 | 242 |
| | 4 | 228 | 227 | 226 | 224 | 229 | 233 | 249 |
| | 5 | 240 | 239 | 238 | 236 | 241 | 245 | 261 |

TABLE 5

| Melting rate of copper (μm/sec) | Cu content (% by mass) | | | | | | |
|---|---|---|---|---|---|---|---|
| | | 0 | 0.2 | 0.4 | 0.8 | 1 | 1.2 | 1.6 |
| Ag content (% by mass) | 0 | 0.610 | 0.520 | 0.430 | 0.290 | 0.230 | 0.170 | 0.100 |
| | 0.5 | 0.510 | 0.440 | 0.370 | 0.240 | 0.195 | 0.150 | 0.085 |
| | 1 | 0.435 | 0.380 | 0.320 | 0.200 | 0.170 | 0.135 | 0.075 |
| | 2 | 0.340 | 0.290 | 0.240 | 0.160 | 0.140 | 0.110 | 0.060 |
| | 3 | 0.290 | 0.240 | 0.190 | 0.140 | 0.120 | 0.090 | 0.045 |
| | 3.5 | 0.270 | 0.220 | 0.180 | 0.130 | 0.110 | 0.080 | 0.040 |
| | 4 | 0.260 | 0.210 | 0.170 | 0.120 | 0.100 | 0.080 | 0.035 |
| | 5 | 0.250 | 0.200 | 0.160 | 0.110 | 0.090 | 0.070 | 0.030 |

Co: 0.02% to 0.06% by Mass

Co is an element that has the effect of preventing copper consuming through the addition of a minute amount thereof as described above. Here, in the case where the content of Co in the solder is less than 0.02% by mass, the effect of preventing copper consuming cannot be gained. On the other hand, when the Co content exceeds 0.06% by mass, the liquidus temperature becomes high so that there is a risk that a defect may be caused to the printed wiring board and to the electronic parts at the time of soldering. In addition, since the viscosity becomes high, the unconformities as shown in the following are caused. First, in the case where the copper circuit on the printed wiring board is coated with solder by means of a hot air leveling method, a defect occurs wherein the thickness of the solder coating becomes uneven. In addition, in some cases a critical defect occurs wherein no solder coating is established or wherein a solder bridge between the adjoining circuits is formed. Secondly, the solder jet flow in the flowing solder becomes unstable so as to lower the yield of soldering and dispersion occurs in the amount of solder of the portion connected through solder to an electronic part so that a critical unconformities occurs wherein the reliability of connections is lowered. Accordingly, the content of Co in the solder should be in a range of 0.02% to 0.06% by mass. In addition, in the case where the Co content is 0.02% to 0.04% by mass, it is more favorable because the increase in the liquidus temperature is extremely small.

Ni: 0.02% to 0.06% by Mass

Ni is an element that has the effect of preventing copper consuming through the addition of a minute amount thereof in the same manner as Co as described above. Here, in the case where the content of Ni in the solder is less than 0.02% by mass, the effect of preventing copper consuming through the addition of Ni cannot be gained. On the other hand, when the Ni content exceeds 0.06% by mass, the liquidus temperature becomes high so that there is a risk that a defect may be caused to the printed wiring board and to the electronic parts at the time of soldering. Accordingly, the content of Ni in the solder is in a range of 0.02% to 0.06% by mass.

Fe: 0.02% to 0.06% by Mass

Fe is an element that has the effect of preventing copper consuming through the addition of a minute amount thereof in the same manner as Ni as described above. Here, in the case where the content of Fe in the solder is less than 0.02% by weight, the effect of preventing copper consuming cannot be gained. On the other hand, when the Fe content exceeds 0.06% by weight, the liquidus temperature becomes high so that there is a risk that a defect may be caused to the printed wiring board and to the electronic parts at the time of soldering. In addition, since the viscosity becomes high, the wettability of the solder is lowered. Accordingly, the content of Fe in the solder should be in a range of 0.02% to 0.06% by weight.

In the case where a circuit formed on the surface of a printed wiring board is coated with solder that has such a composition, a printed wiring board of which the copper consuming is extremely small can be gained. In addition, in the case where an electronic part is soldered to a circuit formed on the surface of a printed wiring board with a solder that has such a composition, the reliability of the mounting can be enhanced.

As described above, it is preferable for the liquidus temperature (melting point) of the solder to be 240° C. or less, and it is more preferable for the liquidus temperature of the solder to be 230° C. or less. Furthermore, it is preferable for the melting rate of copper to be 0.17 μm/sec, or less, for practical use.

In the following, the embodiments of the present invention are described concretely in relation to comparison examples that are out of the scope of the claims.

First, solders that have compositions as in the described Tables 6 through 14 below were prepared. Here, the remaining portions in the compositions shown in Tables 6 through 14 are all Sn and inevitable impurities.

TABLE 6

| No. | Composition (% by mass) | | | |
|---|---|---|---|---|
| | Ag | Cu | Co | Ni |
| 1 | 2 | 0.2 | 0 | 0 |
| 2 | 2 | 0.2 | 0.02 | 0 |
| 3 | 2 | 0.2 | 0.04 | 0 |
| 4 | 2 | 0.2 | 0.06 | 0 |
| 5 | 2 | 0.2 | 0.08 | 0 |
| 6 | 2 | 0.2 | 0.1 | 0 |
| 7 | 2 | 0.2 | 0.12 | 0 |
| 8 | 2 | 0.2 | 0 | 0.04 |
| 9 | 2 | 0.2 | 0.02 | 0.04 |
| 10 | 2 | 0.2 | 0.04 | 0.04 |
| 11 | 2 | 0.2 | 0.06 | 0.04 |
| 12 | 2 | 0.2 | 0.08 | 0.04 |
| 13 | 2 | 0.2 | 0.1 | 0.04 |
| 14 | 2 | 0.2 | 0.12 | 0.04 |
| 15 | 2 | 0.4 | 0 | 0 |
| 16 | 2 | 0.4 | 0.02 | 0 |
| 17 | 2 | 0.4 | 0.04 | 0 |
| 18 | 2 | 0.4 | 0.06 | 0 |
| 19 | 2 | 0.4 | 0.08 | 0 |
| 20 | 2 | 0.4 | 0.1 | 0 |
| 21 | 2 | 0.4 | 0.12 | 0 |
| 22 | 2 | 0.4 | 0 | 0.04 |
| 23 | 2 | 0.4 | 0.02 | 0.04 |
| 24 | 2 | 0.4 | 0.04 | 0.04 |
| 25 | 2 | 0.4 | 0.06 | 0.04 |
| 26 | 2 | 0.4 | 0.08 | 0.04 |
| 27 | 2 | 0.4 | 0.1 | 0.04 |
| 28 | 2 | 0.4 | 0.12 | 0.04 |

TABLE 7

| No. | Composition (% by mass) | | | |
|---|---|---|---|---|
| | Ag | Cu | Co | Ni |
| 29 | 2 | 0.8 | 0 | 0 |
| 30 | 2 | 0.8 | 0.02 | 0 |
| 31 | 2 | 0.8 | 0.04 | 0 |
| 32 | 2 | 0.8 | 0.06 | 0 |
| 33 | 2 | 0.8 | 0.08 | 0 |
| 34 | 2 | 0.8 | 0.1 | 0 |
| 35 | 2 | 0.8 | 0.12 | 0 |
| 36 | 2 | 0.8 | 0 | 0.04 |
| 37 | 2 | 0.8 | 0.02 | 0.04 |
| 38 | 2 | 0.8 | 0.04 | 0.04 |
| 39 | 2 | 0.8 | 0.06 | 0.04 |
| 40 | 2 | 0.8 | 0.08 | 0.04 |
| 41 | 2 | 0.8 | 0.1 | 0.04 |
| 42 | 2 | 0.8 | 0.12 | 0.04 |
| 43 | 2 | 0.8 | 0.04 | 0.02 |
| 44 | 2 | 0.8 | 0.04 | 0.06 |
| 45 | 2 | 0.8 | 0.04 | 0.08 |
| 46 | 2 | 0.8 | 0.04 | 0.1 |
| 47 | 2 | 0.8 | 0.04 | 0.12 |

TABLE 8

| No. | Composition (% by mass) | | | |
|---|---|---|---|---|
| | Ag | Cu | Co | Ni |
| 48 | 2 | 1.2 | 0 | 0 |
| 49 | 2 | 1.2 | 0.02 | 0 |
| 50 | 2 | 1.2 | 0.04 | 0 |
| 51 | 2 | 1.2 | 0.06 | 0 |
| 52 | 2 | 1.2 | 0.08 | 0 |
| 53 | 2 | 1.2 | 0.1 | 0 |
| 54 | 2 | 1.2 | 0.12 | 0 |
| 55 | 2 | 1.2 | 0 | 0.04 |
| 56 | 2 | 1.2 | 0.02 | 0.04 |
| 57 | 2 | 1.2 | 0.04 | 0.04 |
| 58 | 2 | 1.2 | 0.06 | 0.04 |
| 59 | 2 | 1.2 | 0.08 | 0.04 |
| 60 | 2 | 1.2 | 0.1 | 0.04 |
| 61 | 2 | 1.2 | 0.12 | 0.04 |
| 62 | 2 | 1.6 | 0 | 0 |
| 63 | 2 | 1.6 | 0.02 | 0 |
| 64 | 2 | 1.6 | 0.04 | 0 |
| 65 | 2 | 1.6 | 0.06 | 0 |
| 66 | 2 | 1.6 | 0.08 | 0 |
| 67 | 2 | 1.6 | 0.1 | 0 |
| 68 | 2 | 1.6 | 0.12 | 0 |
| 69 | 2 | 1.6 | 0 | 0.04 |
| 70 | 2 | 1.6 | 0.02 | 0.04 |
| 71 | 2 | 1.6 | 0.04 | 0.04 |
| 72 | 2 | 1.6 | 0.06 | 0.04 |
| 73 | 2 | 1.6 | 0.08 | 0.04 |
| 74 | 2 | 1.6 | 0.1 | 0.04 |
| 75 | 2 | 1.6 | 0.12 | 0.04 |

TABLE 9

| No. | Composition (% by mass) | | | |
|---|---|---|---|---|
| | Ag | Cu | Co | Ni |
| 76 | 0.5 | 0.8 | 0 | 0 |
| 77 | 0.5 | 0.8 | 0.02 | 0 |
| 78 | 0.5 | 0.8 | 0.04 | 0 |
| 79 | 0.5 | 0.8 | 0.06 | 0 |
| 80 | 0.5 | 0.8 | 0.08 | 0 |
| 81 | 0.5 | 0.8 | 0.1 | 0 |
| 82 | 0.5 | 0.8 | 0.12 | 0 |
| 83 | 0.5 | 0.8 | 0 | 0.04 |
| 84 | 0.5 | 0.8 | 0.02 | 0.04 |
| 85 | 0.5 | 0.8 | 0.04 | 0.04 |
| 86 | 0.5 | 0.8 | 0.06 | 0.04 |
| 87 | 0.5 | 0.8 | 0.08 | 0.04 |
| 88 | 0.5 | 0.8 | 0.1 | 0.04 |
| 89 | 0.5 | 0.8 | 0.12 | 0.04 |
| 90 | 1 | 0.8 | 0 | 0 |
| 91 | 1 | 0.8 | 0.02 | 0 |
| 92 | 1 | 0.8 | 0.04 | 0 |
| 93 | 1 | 0.8 | 0.06 | 0 |
| 94 | 1 | 0.8 | 0.08 | 0 |
| 95 | 1 | 0.8 | 0.1 | 0 |
| 96 | 1 | 0.8 | 0.12 | 0 |
| 97 | 1 | 0.8 | 0 | 0.04 |
| 98 | 1 | 0.8 | 0.02 | 0.04 |
| 99 | 1 | 0.8 | 0.04 | 0.04 |
| 100 | 1 | 0.8 | 0.06 | 0.04 |
| 101 | 1 | 0.8 | 0.08 | 0.04 |
| 102 | 1 | 0.8 | 0.1 | 0.04 |
| 103 | 1 | 0.8 | 0.12 | 0.04 |

TABLE 10

| No. | Composition (% by mass) | | | |
|---|---|---|---|---|
| | Ag | Cu | Co | Ni |
| 104 | 3.5 | 0.8 | 0 | 0 |
| 105 | 3.5 | 0.8 | 0.02 | 0 |
| 106 | 3.5 | 0.8 | 0.04 | 0 |
| 107 | 3.5 | 0.8 | 0.06 | 0 |
| 108 | 3.5 | 0.8 | 0.08 | 0 |
| 109 | 3.5 | 0.8 | 0.1 | 0 |
| 110 | 3.5 | 0.8 | 0.12 | 0 |
| 111 | 3.5 | 0.8 | 0 | 0.04 |
| 112 | 3.5 | 0.8 | 0.02 | 0.04 |
| 113 | 3.5 | 0.8 | 0.04 | 0.04 |
| 114 | 3.5 | 0.8 | 0.06 | 0.04 |
| 115 | 3.5 | 0.8 | 0.08 | 0.04 |
| 116 | 3.5 | 0.8 | 0.1 | 0.04 |
| 117 | 3.5 | 0.8 | 0.12 | 0.04 |
| 118 | 4 | 0.8 | 0 | 0 |
| 119 | 4 | 0.8 | 0.02 | 0 |
| 120 | 4 | 0.8 | 0.04 | 0 |
| 121 | 4 | 0.8 | 0.06 | 0 |
| 122 | 4 | 0.8 | 0.08 | 0 |
| 123 | 4 | 0.8 | 0.1 | 0 |
| 124 | 4 | 0.8 | 0.12 | 0 |
| 125 | 4 | 0.8 | 0 | 0.04 |
| 126 | 4 | 0.8 | 0.02 | 0.04 |
| 127 | 4 | 0.8 | 0.04 | 0.04 |
| 128 | 4 | 0.8 | 0.06 | 0.04 |
| 129 | 4 | 0.8 | 0.08 | 0.04 |
| 130 | 4 | 0.8 | 0.1 | 0.04 |
| 131 | 4 | 0.8 | 0.12 | 0.04 |

TABLE 11

| No. | Composition (% by mass) | | | |
|---|---|---|---|---|
| | Ag | Cu | Co | Ni |
| 132 | 5 | 0.8 | 0 | 0 |
| 133 | 5 | 0.8 | 0.02 | 0 |
| 134 | 5 | 0.8 | 0.04 | 0 |
| 135 | 5 | 0.8 | 0.06 | 0 |
| 136 | 5 | 0.8 | 0.08 | 0 |
| 137 | 5 | 0.8 | 0.1 | 0 |
| 138 | 5 | 0.8 | 0.12 | 0 |
| 139 | 5 | 0.8 | 0 | 0.04 |
| 140 | 5 | 0.8 | 0.02 | 0.04 |
| 141 | 5 | 0.8 | 0.04 | 0.04 |
| 142 | 5 | 0.8 | 0.06 | 0.04 |
| 143 | 5 | 0.8 | 0.08 | 0.04 |
| 144 | 5 | 0.8 | 0.1 | 0.04 |
| 145 | 5 | 0.8 | 0.12 | 0.04 |

TABLE 12

| No. | Composition (% by mass) | | | |
|---|---|---|---|---|
| | Ag | Cu | Co | Ni |
| 146 | 2 | 0.1 | 0 | 0 |
| 147 | 2 | 0.1 | 0.02 | 0 |
| 148 | 2 | 0.1 | 0.06 | 0 |
| 149 | 2 | 0.1 | 0.06 | 0 |
| 150 | 2 | 0.1 | 0 | 0.04 |
| 151 | 2 | 0.1 | 0.02 | 0.04 |
| 152 | 2 | 0.1 | 0.06 | 0.04 |
| 153 | 2 | 0.1 | 0.08 | 0.04 |
| 154 | 2 | 0.8 | 0.02 | 0.02 |
| 155 | 2 | 0.8 | 0.02 | 0.06 |
| 156 | 2 | 0.8 | 0.02 | 0.08 |
| 157 | 2 | 0.8 | 0.06 | 0.02 |
| 158 | 2 | 0.8 | 0.06 | 0.06 |
| 159 | 2 | 0.8 | 0.06 | 0.08 |
| 160 | 2 | 0.8 | 0.06 | 0.02 |
| 161 | 2 | 0.8 | 0.06 | 0.06 |
| 162 | 2 | 0.8 | 0.06 | 0.08 |

TABLE 13

| No. | Composition (% by mass) | | | |
|---|---|---|---|---|
| | Ag | Cu | Co | Fe |
| 163 | 3.5 | 0.8 | 0.02 | 0.02 |
| 164 | 3.5 | 0.8 | 0.02 | 0.06 |
| 165 | 3.5 | 0.8 | 0.02 | 0.08 |
| 166 | 3.5 | 0.8 | 0.06 | 0.02 |
| 167 | 3.5 | 0.8 | 0.06 | 0.06 |
| 168 | 3.5 | 0.8 | 0.06 | 0.08 |
| 169 | 3.5 | 0.8 | 0.08 | 0.02 |
| 170 | 3.5 | 0.8 | 0.08 | 0.06 |
| 171 | 3.5 | 0.8 | 0.08 | 0.08 |

TABLE 14

| No. | Composition (% by mass) | | | | |
|---|---|---|---|---|---|
| | Ag | Cu | Co | Ni | Fe |
| 172 | 3.5 | 0.8 | 0.02 | 0.02 | 0.02 |
| 173 | 3.5 | 0.8 | 0.02 | 0.02 | 0.06 |
| 174 | 3.5 | 0.8 | 0.02 | 0.02 | 0.08 |
| 175 | 3.5 | 0.8 | 0.02 | 0.06 | 0.02 |
| 176 | 3.5 | 0.8 | 0.02 | 0.06 | 0.06 |
| 177 | 3.5 | 0.8 | 0.02 | 0.06 | 0.08 |
| 178 | 3.5 | 0.8 | 0.02 | 0.08 | 0.02 |
| 179 | 3.5 | 0.8 | 0.02 | 0.08 | 0.06 |
| 180 | 3.5 | 0.8 | 0.02 | 0.08 | 0.08 |
| 181 | 3.5 | 0.8 | 0.06 | 0.02 | 0.02 |
| 182 | 3.5 | 0.8 | 0.06 | 0.02 | 0.06 |
| 183 | 3.5 | 0.8 | 0.06 | 0.02 | 0.08 |
| 184 | 3.5 | 0.8 | 0.06 | 0.06 | 0.02 |
| 185 | 3.5 | 0.8 | 0.06 | 0.06 | 0.06 |
| 186 | 3.5 | 0.8 | 0.06 | 0.06 | 0.08 |
| 187 | 3.5 | 0.8 | 0.06 | 0.08 | 0.02 |
| 188 | 3.5 | 0.8 | 0.06 | 0.08 | 0.06 |
| 189 | 3.5 | 0.8 | 0.06 | 0.08 | 0.08 |
| 190 | 3.5 | 0.8 | 0.08 | 0.02 | 0.02 |
| 191 | 3.5 | 0.8 | 0.08 | 0.02 | 0.06 |
| 192 | 3.5 | 0.8 | 0.08 | 0.02 | 0.08 |
| 193 | 3.5 | 0.8 | 0.08 | 0.06 | 0.02 |
| 194 | 3.5 | 0.8 | 0.08 | 0.06 | 0.06 |
| 195 | 3.5 | 0.8 | 0.08 | 0.06 | 0.08 |
| 196 | 3.5 | 0.8 | 0.08 | 0.08 | 0.02 |
| 197 | 3.5 | 0.8 | 0.08 | 0.08 | 0.06 |
| 198 | 3.5 | 0.8 | 0.08 | 0.08 | 0.08 |

Then, the melting rate of copper, the melting temperature, the viscosity and the solder spreadability were measured with respect to each of these solders.

In measuring the melting rate of copper, an isopropyl alcohol solution containing 20% of rosin by mass was coated, as a flux, on a copper wire of which the diameter was 0.5 mm and, after that, the copper wire was immersed in a solder bath for a fixed period of time and, then, the amount of decrease in the radius of the copper wire was measured.

In measuring the melting temperature, the solidus temperature was measured by means of a differential thermal analysis method. In addition, a melted solder was put into a test cup so that the viscosity thereof was measured by a VISCOTESTER-VT-04 (made by Rion Co., Ltd.) while the temperature of the solder was gradually cooled down from about 310° C. so as to determine the temperature where the viscosity suddenly increased, which was the liquidus temperature. At the time of measurement of this melting temperature, the viscosity was also measured.

The measurement of the solder spreadability was based on the "8.3.1.1 spread test" described in the soldering flux test method of JIS Z 3197. Concretely, 0.3 g of solder and flux were placed on an oxidized copper plate that was heated for 30 sec at 250° C. so as to spread the solder. After that, the solder was solidified by cooling and the height thereof was measured so as to calculate the solder spreadability.

The results of the above are shown in the following Tables 15 through 23. In the Tables 15 through 23, ○, Δ and X are attached in accordance with the following standards. A liquidus temperature that is 230° C. or less is denoted as ○, a liquidus temperature that exceeds 230° C. and is 240° C. or less is denoted as Δ, and a liquidus temperature that exceeds 240° C. is denoted as X. A melting rate of copper less than 0.17 ($\mu$m/sec) is denoted as ○, a melting rate of copper that is 0.17 ($\mu$m/sec) or more and is less than 0.20 ($\mu$m/sec) is denoted as Δ and a melting rate of copper that is 0.20 ($\mu$m/sec) or more is denoted as X. A viscosity that is 2.5 (cP) or less is denoted as ○ and a viscosity that exceeds 2.5 (cP) is denoted as X. A solder spreadability that is 75(%) or more is denoted as ○ and a solder spreadability that is less than 75(%) is denoted as X. Then, a synthetic evaluation (total) that includes X in any item is denoted as X, a synthetic evaluation that includes Δ in any item from among synthetic evaluations that are not denoted as X is denoted as Δ and the remaining synthetic evaluations, that is to say the synthetic evaluations with ○ for every item, are denoted as ○.

TABLE 15

| No. | Solidus temperature (° C.) | Liquidus temperature (° C.) | | Melting rate of copper ($\mu$m/sec) | | Viscosity (cP) | | Spreadability (%) | | Total |
|---|---|---|---|---|---|---|---|---|---|---|
| 1 | 217 | 224 | ○ | 0.28 | X | 1.9 | ○ | 77 | ○ | X |
| 2 | 217 | 224 | ○ | 0.18 | Δ | 1.9 | ○ | 77 | ○ | Δ |
| 3 | 217 | 224 | ○ | 0.12 | ○ | 1.9 | ○ | 77 | ○ | ○ |
| 4 | 217 | 235 | Δ | 0.1 | ○ | 1.9 | ○ | 77 | ○ | Δ |
| 5 | 217 | 250 | X | 0.08 | ○ | 2 | ○ | 77 | ○ | X |
| 6 | 217 | 263 | X | 0.06 | ○ | 2.5 | ○ | 76 | ○ | X |
| 7 | 217 | 275 | X | 0.04 | ○ | 3 | X | 76 | ○ | X |
| 8 | 217 | 224 | ○ | 0.25 | X | 1.9 | ○ | 77 | ○ | X |
| 9 | 217 | 224 | ○ | 0.16 | ○ | 1.9 | ○ | 77 | ○ | ○ |
| 10 | 217 | 224 | ○ | 0.1 | ○ | 1.9 | ○ | 77 | ○ | ○ |
| 11 | 217 | 237 | Δ | 0.08 | ○ | 1.9 | ○ | 77 | ○ | Δ |
| 12 | 217 | 252 | X | 0.06 | ○ | 2.1 | ○ | 77 | ○ | X |
| 13 | 217 | 265 | X | 0.05 | ○ | 2.7 | X | 76 | ○ | X |
| 14 | 217 | 278 | X | 0.03 | ○ | 3.2 | X | 76 | ○ | X |
| 15 | 217 | 223 | ○ | 0.25 | X | 1.9 | ○ | 77 | ○ | X |
| 16 | 217 | 223 | ○ | 0.15 | ○ | 1.9 | ○ | 77 | ○ | ○ |
| 17 | 217 | 223 | ○ | 0.1 | ○ | 1.9 | ○ | 77 | ○ | ○ |
| 18 | 217 | 234 | Δ | 0.08 | ○ | 1.9 | ○ | 77 | ○ | Δ |
| 19 | 217 | 249 | X | 0.06 | ○ | 2 | ○ | 77 | ○ | X |
| 20 | 217 | 264 | X | 0.05 | ○ | 2.4 | ○ | 76 | ○ | X |
| 21 | 217 | 276 | X | 0.03 | ○ | 2.9 | X | 76 | ○ | X |
| 22 | 217 | 223 | ○ | 0.22 | X | 1.9 | ○ | 77 | ○ | X |
| 23 | 217 | 223 | ○ | 0.13 | ○ | 1.9 | ○ | 77 | ○ | ○ |
| 24 | 217 | 223 | ○ | 0.09 | ○ | 1.9 | ○ | 77 | ○ | ○ |
| 25 | 217 | 235 | Δ | 0.07 | ○ | 1.9 | ○ | 77 | ○ | Δ |
| 26 | 217 | 250 | X | 0.05 | ○ | 2 | ○ | 77 | ○ | X |
| 27 | 217 | 265 | X | 0.03 | ○ | 2.5 | ○ | 76 | ○ | X |
| 28 | 217 | 278 | X | 0.02 | ○ | 3 | X | 76 | ○ | X |

TABLE 16

| No. | Solidus temperature (° C.) | Liquidus temperature (° C.) | | Melting rate of copper ($\mu$m/sec) | | Viscosity (cP) | | Spreadability (%) | | Total |
|---|---|---|---|---|---|---|---|---|---|---|
| 29 | 217 | 221 | ○ | 0.21 | X | 1.9 | ○ | 77 | ○ | X |
| 30 | 217 | 221 | ○ | 0.11 | ○ | 1.9 | ○ | 77 | ○ | ○ |
| 31 | 217 | 221 | ○ | 0.07 | ○ | 1.9 | ○ | 77 | ○ | ○ |
| 32 | 217 | 232 | Δ | 0.05 | ○ | 1.9 | ○ | 77 | ○ | Δ |
| 33 | 217 | 248 | X | 0.03 | ○ | 2 | ○ | 77 | ○ | X |
| 34 | 217 | 264 | X | 0.02 | ○ | 2.6 | X | 77 | ○ | X |
| 35 | 217 | 277 | X | 0.01 | ○ | 3.1 | X | 76 | ○ | X |
| 36 | 217 | 221 | ○ | 0.11 | ○ | 1.9 | ○ | 77 | ○ | ○ |
| 37 | 217 | 221 | ○ | 0.07 | ○ | 1.9 | ○ | 77 | ○ | ○ |
| 38 | 217 | 221 | ○ | 0.05 | ○ | 1.9 | ○ | 77 | ○ | ○ |
| 39 | 217 | 234 | Δ | 0.03 | ○ | 1.9 | ○ | 77 | ○ | Δ |
| 40 | 217 | 250 | X | 0.02 | ○ | 2 | ○ | 77 | ○ | X |
| 41 | 217 | 267 | X | 0.01 | ○ | 2.7 | X | 77 | ○ | X |
| 42 | 217 | 281 | X | 0 | ○ | 3.3 | X | 76 | ○ | X |
| 43 | 217 | 221 | ○ | 0.06 | ○ | 1.9 | ○ | 77 | ○ | ○ |
| 44 | 217 | 237 | Δ | 0.04 | ○ | 1.9 | ○ | 77 | ○ | Δ |
| 45 | 217 | 253 | X | 0.03 | ○ | 2.1 | ○ | 77 | ○ | X |
| 46 | 217 | 270 | X | 0.02 | ○ | 2.8 | X | 77 | ○ | X |
| 47 | 217 | 284 | X | 0.01 | ○ | 3.5 | X | 76 | ○ | X |

TABLE 17

| No. | Solidus temperature (° C.) | Liquidus temperature (° C.) | | Melting rate of copper ($\mu$m/sec) | | Viscosity (cP) | | Spreadability (%) | | Total |
|---|---|---|---|---|---|---|---|---|---|---|
| 48 | 217 | 234 | Δ | 0.16 | ○ | 1.9 | ○ | 77 | ○ | Δ |
| 49 | 217 | 234 | Δ | 0.09 | ○ | 1.9 | ○ | 77 | ○ | Δ |
| 50 | 217 | 234 | Δ | 0.05 | ○ | 1.9 | ○ | 77 | ○ | Δ |
| 51 | 217 | 236 | Δ | 0.04 | ○ | 1.9 | ○ | 77 | ○ | Δ |
| 52 | 217 | 252 | X | 0.03 | ○ | 2 | ○ | 77 | ○ | X |
| 53 | 217 | 266 | X | 0.02 | ○ | 2.7 | X | 77 | ○ | X |
| 54 | 217 | 279 | X | 0.01 | ○ | 3.2 | X | 76 | ○ | X |
| 55 | 217 | 234 | Δ | 0.1 | ○ | 1.9 | ○ | 77 | ○ | Δ |
| 56 | 217 | 234 | Δ | 0.06 | ○ | 1.9 | ○ | 77 | ○ | Δ |
| 57 | 217 | 234 | Δ | 0.04 | ○ | 1.9 | ○ | 77 | ○ | Δ |
| 58 | 217 | 237 | Δ | 0.03 | ○ | 1.9 | ○ | 77 | ○ | Δ |
| 59 | 217 | 254 | X | 0.02 | ○ | 2.1 | ○ | 77 | ○ | X |
| 60 | 217 | 270 | X | 0.01 | ○ | 2.8 | X | 77 | ○ | X |
| 61 | 217 | 283 | X | 0 | ○ | 3.4 | X | 76 | ○ | X |
| 62 | 217 | 248 | X | 0.1 | ○ | 1.9 | ○ | 77 | ○ | X |
| 63 | 217 | 248 | X | 0.07 | ○ | 1.9 | ○ | 77 | ○ | X |
| 64 | 217 | 248 | X | 0.04 | ○ | 1.9 | ○ | 77 | ○ | X |
| 65 | 217 | 250 | X | 0.03 | ○ | 1.9 | ○ | 77 | ○ | X |
| 66 | 217 | 254 | X | 0.02 | ○ | 2.1 | ○ | 77 | ○ | X |
| 67 | 217 | 266 | X | 0.01 | ○ | 2.7 | X | 76 | ○ | X |
| 68 | 217 | 280 | X | 0 | ○ | 3.8 | X | 75 | ○ | X |
| 69 | 217 | 248 | X | 0.08 | ○ | 1.9 | ○ | 77 | ○ | X |
| 70 | 217 | 248 | X | 0.05 | ○ | 1.9 | ○ | 77 | ○ | X |
| 71 | 217 | 248 | X | 0.03 | ○ | 1.9 | ○ | 77 | ○ | X |
| 72 | 217 | 251 | X | 0.02 | ○ | 2.1 | ○ | 77 | ○ | X |
| 73 | 217 | 256 | X | 0.01 | ○ | 2.3 | ○ | 77 | ○ | X |
| 74 | 217 | 268 | X | 0.01 | ○ | 2.9 | X | 76 | ○ | X |
| 75 | 217 | 283 | X | 0 | ○ | 3.9 | X | 75 | ○ | X |

TABLE 18

| No. | Solidus temperature (° C.) | Liquidus temperature (° C.) | | Melting rate of copper ($\mu$m/sec) | | Viscosity (cP) | | Spreadability (%) | | Total |
|---|---|---|---|---|---|---|---|---|---|---|
| 76 | 217 | 225 | ○ | 0.24 | X | 1.9 | ○ | 76 | ○ | X |
| 77 | 217 | 225 | ○ | 0.15 | ○ | 1.9 | ○ | 76 | ○ | ○ |
| 78 | 217 | 225 | ○ | 0.09 | ○ | 1.9 | ○ | 76 | ○ | ○ |
| 79 | 217 | 230 | ○ | 0.06 | ○ | 1.9 | ○ | 76 | ○ | ○ |
| 80 | 217 | 241 | X | 0.04 | ○ | 1.9 | ○ | 76 | ○ | X |
| 81 | 217 | 254 | X | 0.03 | ○ | 2.1 | ○ | 76 | ○ | X |

TABLE 18-continued

| No. | Solidus temperature (° C.) | Liquidus temperature (° C.) | | Melting rate of copper (μm/sec) | | Viscosity (cP) | | Spreadability (%) | | Total |
|---|---|---|---|---|---|---|---|---|---|---|
| 82 | 217 | 266 | X | 0.02 | ○ | 2.7 | X | 75 | ○ | X |
| 83 | 217 | 225 | ○ | 0.15 | ○ | 1.9 | ○ | 76 | ○ | ○ |
| 84 | 217 | 225 | ○ | 0.09 | ○ | 1.9 | ○ | 76 | ○ | ○ |
| 85 | 217 | 225 | ○ | 0.05 | ○ | 1.9 | ○ | 76 | ○ | ○ |
| 86 | 217 | 230 | ○ | 0.04 | ○ | 1.9 | ○ | 76 | ○ | ○ |
| 87 | 217 | 243 | X | 0.03 | ○ | 1.9 | ○ | 76 | ○ | X |
| 88 | 217 | 256 | X | 0.02 | ○ | 2.2 | ○ | 76 | ○ | X |
| 89 | 217 | 269 | X | 0.01 | ○ | 2.9 | X | 75 | ○ | X |
| 90 | 217 | 224 | ○ | 0.23 | X | 1.9 | ○ | 77 | ○ | X |
| 91 | 217 | 224 | ○ | 0.13 | ○ | 1.9 | ○ | 77 | ○ | ○ |
| 92 | 217 | 224 | ○ | 0.08 | ○ | 1.9 | ○ | 77 | ○ | ○ |
| 93 | 217 | 230 | ○ | 0.06 | ○ | 1.9 | ○ | 77 | ○ | ○ |
| 94 | 217 | 240 | △ | 0.04 | ○ | 1.9 | ○ | 77 | ○ | △ |
| 95 | 217 | 253 | X | 0.03 | ○ | 2.1 | ○ | 77 | ○ | X |
| 96 | 217 | 265 | X | 0.02 | ○ | 2.7 | X | 76 | ○ | X |
| 97 | 217 | 224 | ○ | 0.14 | ○ | 1.9 | ○ | 77 | ○ | ○ |
| 98 | 217 | 224 | ○ | 0.09 | ○ | 1.9 | ○ | 77 | ○ | ○ |
| 99 | 217 | 224 | ○ | 0.07 | ○ | 1.9 | ○ | 77 | ○ | ○ |
| 100 | 217 | 232 | △ | 0.05 | ○ | 1.9 | ○ | 77 | ○ | △ |
| 101 | 217 | 241 | X | 0.03 | ○ | 1.9 | ○ | 77 | ○ | X |
| 102 | 217 | 255 | X | 0.02 | ○ | 2.2 | ○ | 77 | ○ | X |
| 103 | 217 | 268 | X | 0.01 | ○ | 2.8 | X | 76 | ○ | X |

TABLE 19

| No. | Solidus temperature (° C.) | Liquidus temperature (° C.) | | Melting rate of copper (μm/sec) | | Viscosity (cP) | | Spreadability (%) | | Total |
|---|---|---|---|---|---|---|---|---|---|---|
| 104 | 217 | 217 | ○ | 0.17 | △ | 1.9 | ○ | 78 | ○ | △ |
| 105 | 217 | 217 | ○ | 0.09 | ○ | 1.9 | ○ | 78 | ○ | ○ |
| 106 | 217 | 217 | ○ | 0.05 | ○ | 1.9 | ○ | 78 | ○ | ○ |
| 107 | 217 | 228 | ○ | 0.03 | ○ | 1.9 | ○ | 78 | ○ | ○ |
| 108 | 217 | 242 | X | 0.02 | ○ | 1.9 | ○ | 78 | ○ | X |
| 109 | 217 | 256 | X | 0.01 | ○ | 2.3 | ○ | 77 | ○ | X |
| 110 | 217 | 270 | X | 0 | ○ | 2.8 | X | 76 | ○ | X |
| 111 | 217 | 217 | ○ | 0.12 | ○ | 1.9 | ○ | 78 | ○ | ○ |
| 112 | 217 | 217 | ○ | 0.07 | ○ | 1.9 | ○ | 78 | ○ | ○ |
| 113 | 217 | 217 | ○ | 0.04 | ○ | 1.9 | ○ | 78 | ○ | ○ |
| 114 | 217 | 228 | ○ | 0.03 | ○ | 1.9 | ○ | 78 | ○ | ○ |
| 115 | 217 | 248 | X | 0.02 | ○ | 2 | ○ | 78 | ○ | X |
| 116 | 217 | 265 | X | 0.01 | ○ | 2.6 | X | 77 | ○ | X |
| 117 | 217 | 280 | X | 0 | ○ | 3 | X | 76 | ○ | X |
| 118 | 217 | 216 | ○ | 0.15 | ○ | 1.9 | ○ | 78 | ○ | ○ |
| 119 | 217 | 216 | ○ | 0.08 | ○ | 1.9 | ○ | 78 | ○ | ○ |
| 120 | 217 | 216 | ○ | 0.05 | ○ | 1.9 | ○ | 78 | ○ | ○ |
| 121 | 217 | 220 | ○ | 0.03 | ○ | 1.9 | ○ | 78 | ○ | ○ |
| 122 | 217 | 227 | ○ | 0.02 | ○ | 1.9 | ○ | 78 | ○ | ○ |
| 123 | 217 | 235 | △ | 0.01 | ○ | 2 | ○ | 77 | ○ | △ |
| 124 | 217 | 248 | X | 0 | ○ | 2.6 | X | 77 | ○ | X |
| 125 | 217 | 216 | ○ | 0.12 | ○ | 1.9 | ○ | 78 | ○ | ○ |
| 126 | 217 | 216 | ○ | 0.06 | ○ | 1.9 | ○ | 78 | ○ | ○ |
| 127 | 217 | 216 | ○ | 0.04 | ○ | 1.9 | ○ | 78 | ○ | ○ |
| 128 | 217 | 220 | ○ | 0.03 | ○ | 1.9 | ○ | 78 | ○ | ○ |
| 129 | 217 | 228 | ○ | 0.02 | ○ | 2 | ○ | 78 | ○ | ○ |
| 130 | 217 | 237 | △ | 0.01 | ○ | 2.1 | ○ | 77 | ○ | △ |
| 131 | 217 | 252 | X | 0 | ○ | 2.8 | X | 77 | ○ | X |

TABLE 20

| No. | Solidus temperature (° C.) | Liquidus temperature (° C.) | | Melting rate of copper (μm/sec) | | Viscosity (cP) | | Spreadability (%) | | Total |
|---|---|---|---|---|---|---|---|---|---|---|
| 132 | 217 | 236 | △ | 0.11 | ○ | 2 | ○ | 77 | ○ | △ |
| 133 | 217 | 236 | △ | 0.06 | ○ | 2 | ○ | 77 | ○ | △ |
| 134 | 217 | 236 | △ | 0.04 | ○ | 2 | ○ | 77 | ○ | △ |
| 135 | 217 | 236 | △ | 0.03 | ○ | 2 | ○ | 77 | ○ | △ |
| 136 | 217 | 241 | X | 0.02 | ○ | 2 | ○ | 77 | ○ | X |
| 137 | 217 | 256 | X | 0.01 | ○ | 2.4 | ○ | 77 | ○ | X |
| 138 | 217 | 281 | X | 0 | ○ | 3.1 | X | 76 | ○ | X |
| 139 | 217 | 236 | △ | 0.09 | ○ | 2 | ○ | 77 | ○ | △ |
| 140 | 217 | 236 | △ | 0.05 | ○ | 2 | ○ | 77 | ○ | △ |
| 141 | 217 | 236 | △ | 0.03 | ○ | 2 | ○ | 77 | ○ | △ |
| 142 | 217 | 240 | △ | 0.02 | ○ | 2 | ○ | 77 | ○ | △ |
| 143 | 217 | 246 | X | 0.01 | ○ | 2 | ○ | 77 | ○ | X |
| 144 | 217 | 260 | X | 0 | ○ | 2.6 | X | 77 | ○ | X |
| 145 | 217 | 287 | X | 0 | ○ | 3.3 | X | 76 | ○ | X |

TABLE 21

| No. | Solidus temperature (° C.) | Liquidus temperature (° C.) | | Melting rate of copper (μm/sec) | | Viscosity (cP) | | Spreadability (%) | | Total |
|---|---|---|---|---|---|---|---|---|---|---|
| 146 | 217 | 225 | ○ | 0.30 | X | 1.9 | ○ | 77 | ○ | X |
| 147 | 217 | 225 | ○ | 0.19 | △ | 1.9 | ○ | 77 | ○ | △ |
| 148 | 217 | 236 | △ | 0.11 | ○ | 2.0 | ○ | 77 | ○ | △ |
| 149 | 217 | 248 | X | 0.09 | ○ | 2.0 | ○ | 77 | ○ | X |
| 150 | 217 | 225 | ○ | 0.27 | X | 1.9 | ○ | 77 | ○ | X |
| 151 | 217 | 225 | ○ | 0.17 | ○ | 1.9 | ○ | 77 | ○ | ○ |
| 152 | 217 | 238 | △ | 0.09 | ○ | 2.0 | ○ | 77 | ○ | △ |
| 153 | 217 | 256 | X | 0.07 | ○ | 2.2 | ○ | 77 | ○ | X |
| 154 | 217 | 221 | ○ | 0.09 | ○ | 1.9 | ○ | 77 | ○ | ○ |
| 155 | 217 | 232 | △ | 0.05 | ○ | 1.9 | ○ | 77 | ○ | △ |
| 156 | 217 | 250 | X | 0.04 | ○ | 2.1 | ○ | 77 | ○ | X |
| 157 | 217 | 221 | ○ | 0.04 | ○ | 1.9 | ○ | 77 | ○ | ○ |
| 158 | 217 | 236 | △ | 0.03 | ○ | 2.0 | ○ | 77 | ○ | △ |
| 159 | 217 | 254 | X | 0.02 | ○ | 2.2 | ○ | 77 | ○ | X |
| 160 | 217 | 246 | X | 0.03 | ○ | 2.1 | ○ | 77 | ○ | X |
| 161 | 217 | 254 | X | 0.02 | ○ | 2.2 | ○ | 77 | ○ | X |
| 162 | 217 | 266 | X | 0.01 | ○ | 2.4 | ○ | 76 | ○ | X |

TABLE 22

| No. | Solidus temperature (° C.) | Liquidus temperature (° C.) | | Melting rate of copper (μm/sec) | | Viscosity (cP) | | Spreadability (%) | | Total |
|---|---|---|---|---|---|---|---|---|---|---|
| 163 | 217 | 217 | ○ | 0.10 | ○ | 1.9 | ○ | 77 | ○ | ○ |
| 164 | 217 | 219 | ○ | 0.09 | ○ | 1.9 | ○ | 77 | ○ | ○ |
| 165 | 217 | 221 | ○ | 0.09 | ○ | 2.0 | ○ | 77 | ○ | ○ |
| 166 | 217 | 222 | ○ | 0.05 | ○ | 1.9 | ○ | 77 | ○ | ○ |
| 167 | 217 | 224 | ○ | 0.04 | ○ | 2.0 | ○ | 77 | ○ | ○ |
| 168 | 217 | 226 | ○ | 0.04 | ○ | 2.1 | ○ | 77 | ○ | ○ |
| 169 | 217 | 244 | X | 0.02 | ○ | 2.1 | ○ | 77 | ○ | X |
| 170 | 217 | 246 | X | 0.02 | ○ | 2.2 | ○ | 77 | ○ | X |
| 171 | 217 | 248 | X | 0.02 | ○ | 2.3 | ○ | 77 | ○ | X |

TABLE 23

| No. | Solidus temperature (° C.) | Liquidus temperature (° C.) | | Melting rate of copper (μm/sec) | | Viscosity (cP) | | Spreadability (%) | | Total |
|---|---|---|---|---|---|---|---|---|---|---|
| 172 | 217 | 217 | ○ | 0.07 | ○ | 1.9 | ○ | 77 | ○ | ○ |
| 173 | 217 | 219 | ○ | 0.06 | ○ | 2.1 | ○ | 77 | ○ | ○ |
| 174 | 217 | 221 | ○ | 0.06 | ○ | 2.3 | ○ | 77 | ○ | ○ |
| 175 | 217 | 230 | ○ | 0.04 | ○ | 2.0 | ○ | 77 | ○ | ○ |
| 176 | 217 | 232 | △ | 0.04 | ○ | 2.3 | ○ | 77 | ○ | △ |
| 177 | 217 | 234 | △ | 0.03 | ○ | 2.5 | ○ | 77 | ○ | △ |

TABLE 23-continued

| No. | Solidus temperature (° C.) | Liquidus temperature (° C.) | Melting rate of copper (μm/sec) | | Viscosity (cP) | | Spreadability (%) | | Total |
|---|---|---|---|---|---|---|---|---|---|
| 178 | 217 | 248 | X | 0.03 | ○ | 2.2 | ○ | 77 | ○ | X |
| 179 | 217 | 250 | X | 0.03 | ○ | 2.5 | ○ | 77 | ○ | X |
| 180 | 217 | 252 | X | 0.03 | ○ | 2.8 | X | 77 | ○ | X |
| 181 | 217 | 224 | ○ | 0.04 | ○ | 2.0 | ○ | 77 | ○ | ○ |
| 182 | 217 | 226 | ○ | 0.03 | ○ | 2.3 | ○ | 77 | ○ | ○ |
| 183 | 217 | 228 | ○ | 0.03 | ○ | 2.7 | X | 77 | ○ | X |
| 184 | 217 | 232 | Δ | 0.03 | ○ | 2.1 | ○ | 77 | ○ | Δ |
| 185 | 217 | 234 | Δ | 0.02 | ○ | 2.4 | ○ | 77 | ○ | Δ |
| 186 | 217 | 236 | Δ | 0.02 | ○ | 2.9 | X | 77 | ○ | X |
| 187 | 217 | 250 | X | 0.02 | ○ | 2.3 | ○ | 77 | ○ | X |
| 188 | 217 | 252 | X | 0.02 | ○ | 2.6 | X | 77 | ○ | X |
| 189 | 217 | 254 | X | 0.02 | ○ | 3.1 | X | 77 | ○ | X |
| 190 | 217 | 246 | X | 0.02 | ○ | 2.2 | ○ | 76 | ○ | X |
| 191 | 217 | 248 | X | 0.02 | ○ | 2.6 | X | 77 | ○ | X |
| 192 | 217 | 250 | X | 0.02 | ○ | 3.0 | X | 77 | ○ | X |
| 193 | 217 | 254 | X | 0.01 | ○ | 2.4 | ○ | 77 | ○ | X |
| 194 | 217 | 256 | X | 0.01 | ○ | 2.7 | X | 77 | ○ | X |
| 195 | 217 | 258 | X | 0.01 | ○ | 3.1 | X | 77 | ○ | X |
| 196 | 217 | 266 | X | 0.01 | ○ | 2.6 | X | 76 | ○ | X |
| 197 | 217 | 268 | X | 0.01 | ○ | 2.9 | X | 76 | ○ | X |
| 198 | 217 | 270 | X | 0.01 | ○ | 3.4 | X | 77 | ○ | X |

The results of the above are shown in a graph. Here, ○, Δ and X shown in the following graph indicates synthetic evaluations in the above described Tables 15 through 23.

FIGS. 2A and 2B are graphs showing the relationships between the Co content and the Cu content when the Ag content is fixed at 2% by mass. FIG. 2A is a graph showing the evaluation result of the case where Ni is not contained while FIG. 2B is a graph showing the evaluation result of the case that 0.04% of Ni by mass is contained. That is to say, FIG. 2A shows the evaluation results of Nos. 1 to 7, Nos. 15 to 21, Nos. 29 to 35, Nos. 48 to 54, Nos. 62 to 68 and Nos. 146 to 149 while FIG. 2B shows the evaluation results of Nos. 8 to 14, Nos. 22 to 28, Nos. 36 to 42, Nos. 55 to 61, Nos. 69 to 75 and Nos. 150 to 153.

Figure 3B:
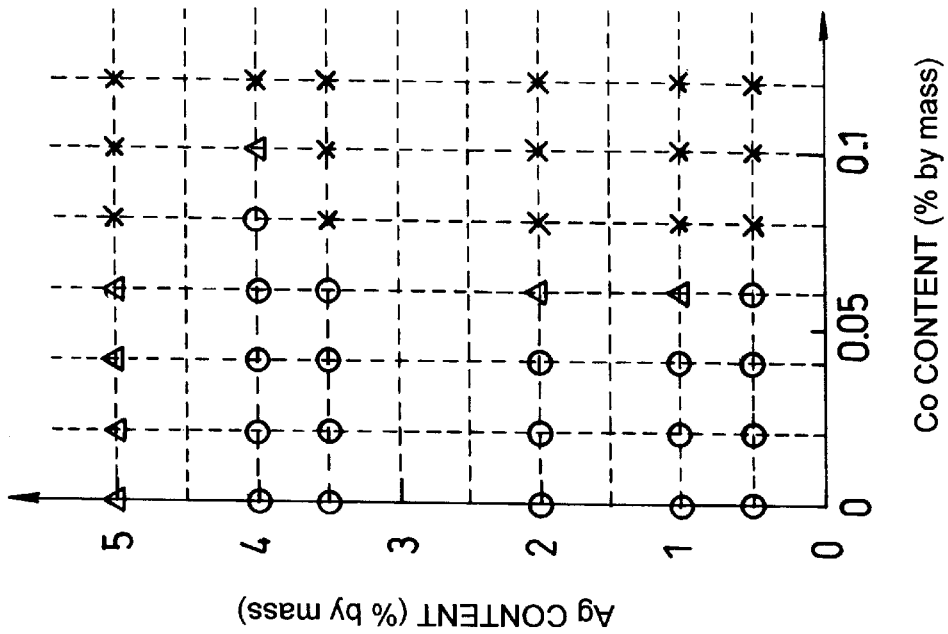
FIG. 3B is in the case of containing 0.04% of Ni by mass.
Figure 3A:
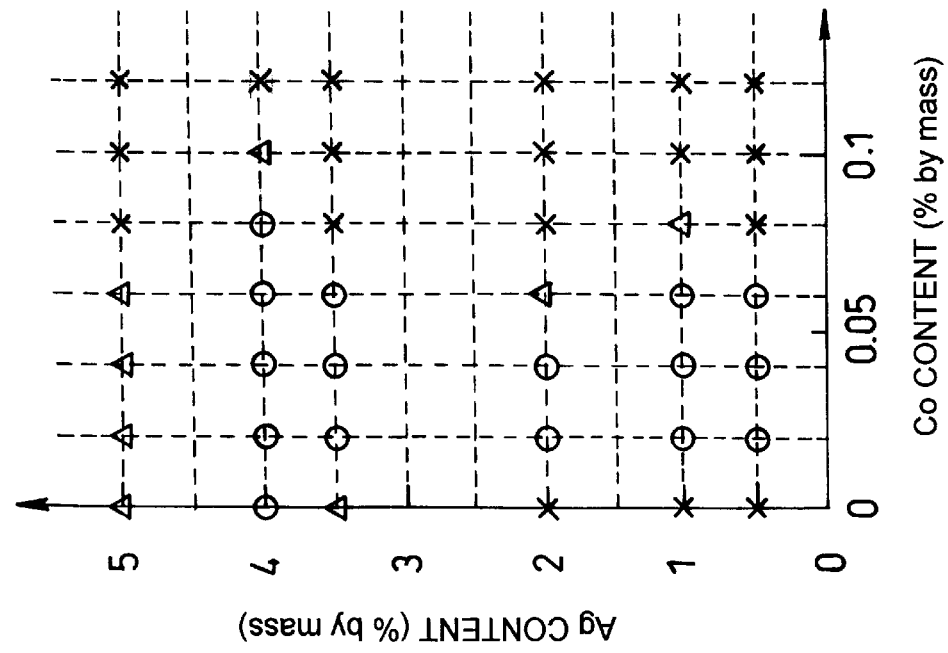

FIGS. 3A and 3B are graphs showing the relationship between the Co content and the Ag content when the Cu content is fixed at 0.8% by mass. FIG. 3A is a graph showing the evaluation result of the case wherein Ni is not contained while FIG. 3B is a graph showing the evaluation result of the case wherein 0.04% of Ni by mass is contained. That is to say, FIG. 3A shows the evaluation results of Nos. 29 to 35, Nos. 76 to 82, Nos. 90 to 96, Nos. 104 to 110, Nos. 118 to 124 and Nos. 132 to 138 while FIG. 3B shows the evaluation results of Nos. 36 to 42, Nos. 83 to 89, Nos. 97 to 103, Nos. 111 to 117, Nos. 125 to 131 and Nos. 139 to 145.

Figure 4A:
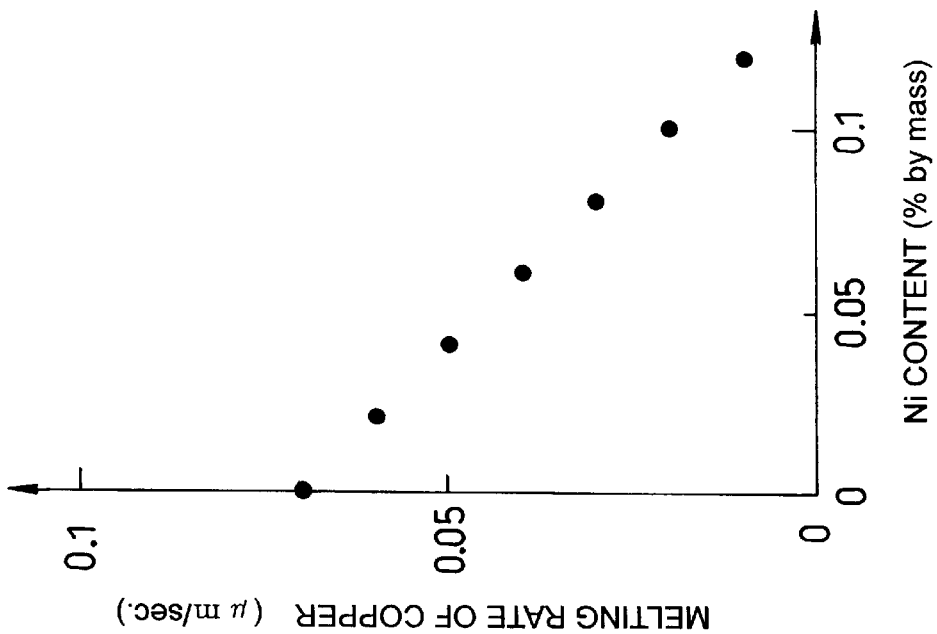
Figure 4B:
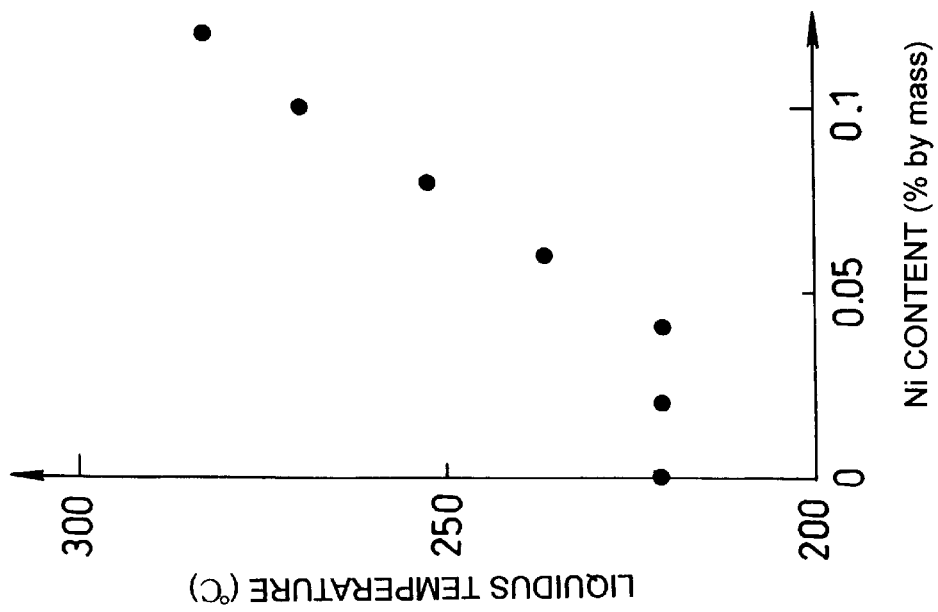
FIG. 4B is a graph of Sn-2% Ag-0.8% Cu-0.04% Co—Ni showing the relationship between the Ni content and the melting rate of copper.
Figure 5:
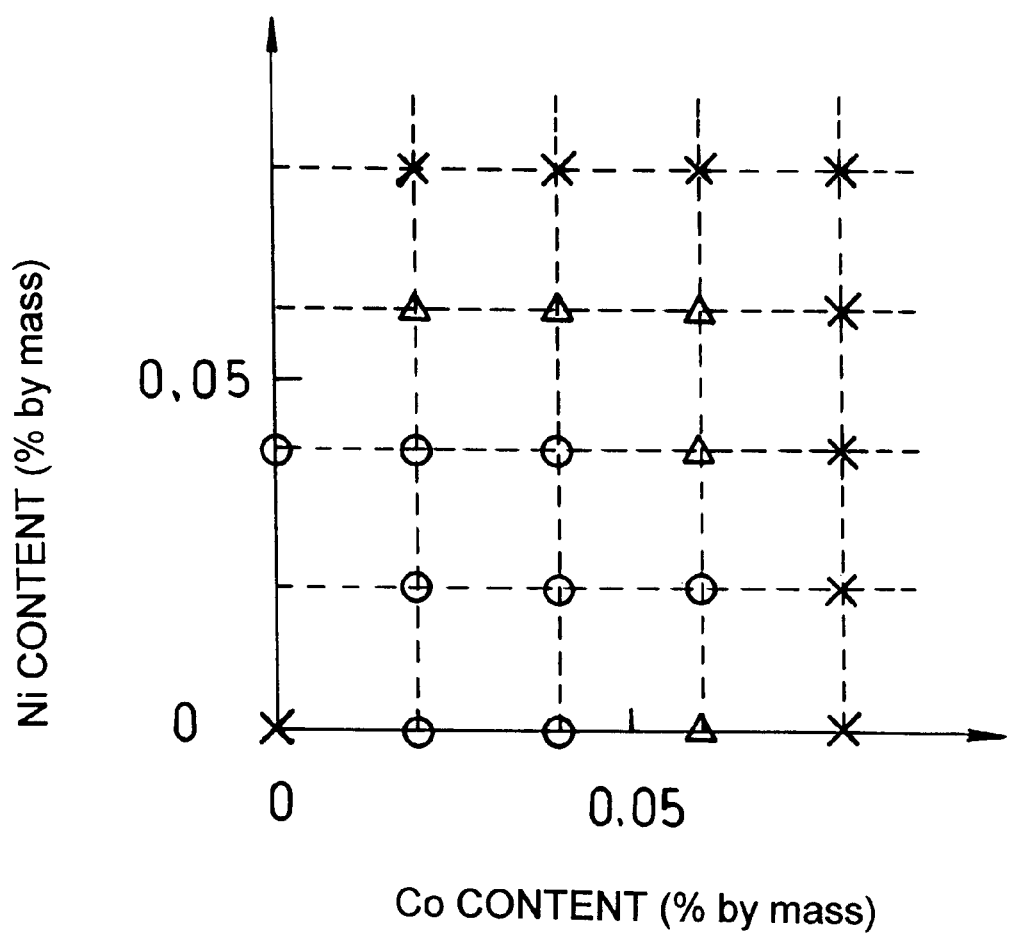
FIG. 5 is a graph of Sn—Ag—Cu—Co—Ni showing the evaluation result of the relationship between the Co content and the Ni content when the Ag content is fixed at 2% by mass and the Cu content is fixed at 0.8% by mass.

FIGS. 4A and 4B are graphs showing the relationship between the Ni content and the liquidus temperature while FIG. 4B is a graph showing the relationship of the Ni content and the melting rate of copper. That is to say, FIGS. 4A and 4B show the evaluation results of No. 31, No. 38 and Nos. 43 to 47 (evaluation results with respect to a solder of Sn-2% of Ag by mass-0.8% of Cu by mass-0.04% of Co by mass-Ni). FIG. 5 is a graph showing the evaluation result of relationships between the Co content and the Ni content when the Ag content is fixed at 2% by mass and the Cu content is fixed at 0.8% by mass. That is to say, FIG. 5 shows the evaluation results of Nos. 29 to 33, Nos. 36 to 40, Nos. 43 to 45 and Nos. 154 to 162.

Figure 6B:
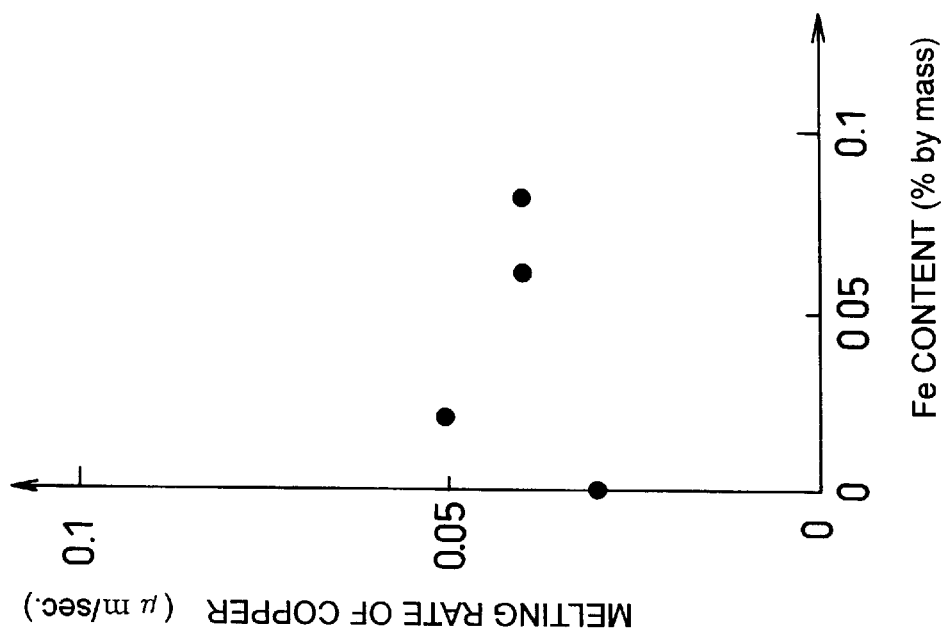
FIG. 6B is a graph of Sn-3.5% Ag-0.8% Cu-0.06% Co—Fe showing the relationship between the Fe content and the melting rate of copper.
Figure 6A:
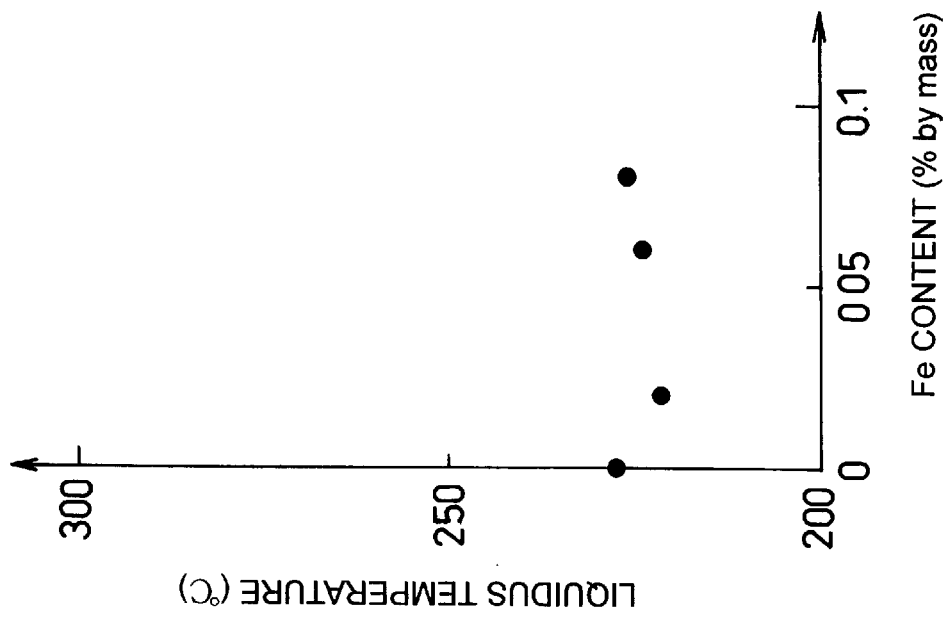
Figure 7:
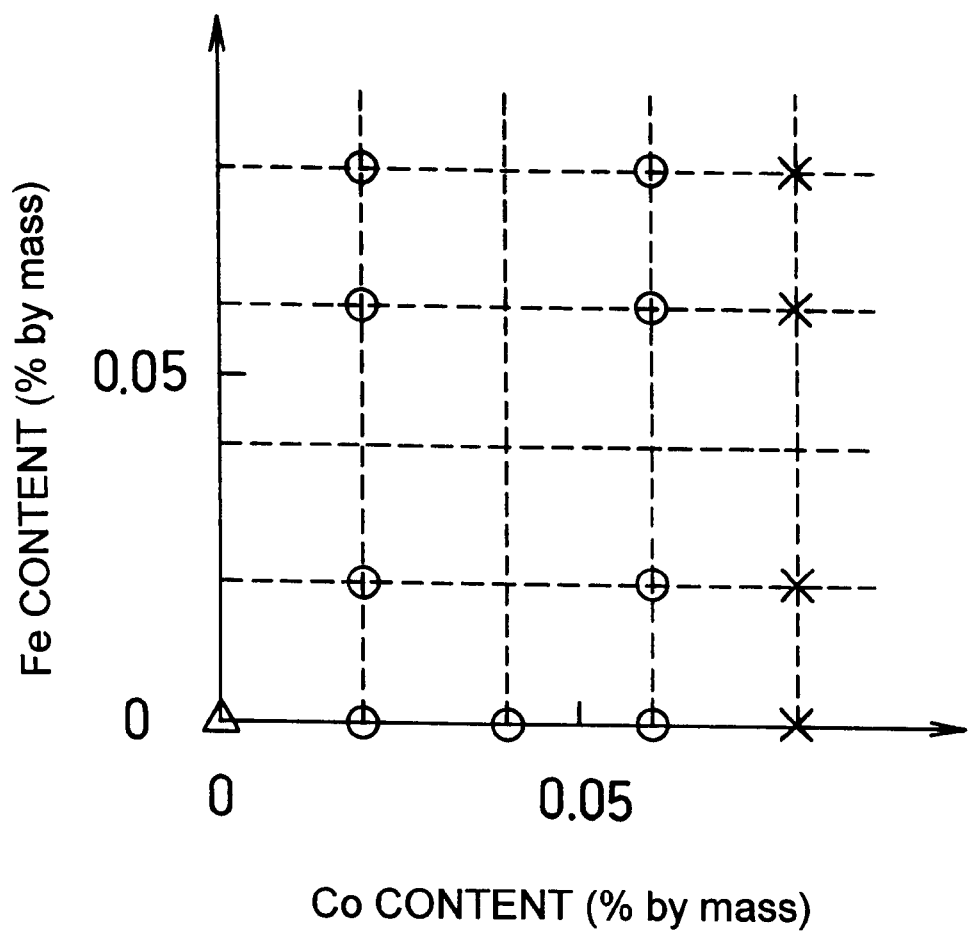
FIG. 7 is a graph of Sn—Ag—Cu—Co—Fe showing the evaluation result of the relationship between the Co content and the Fe content when the Ag content is fixed at 3.5% by mass and the Cu content is fixed at 0.8% by mass.

FIG. 6A is a graph showing the relationship between the Fe content and the liquidus temperature while FIG. 6B is a graph showing the relationship between the Fe content and the melting rate of copper. That is to say, FIGS. 6A and 6B show the evaluation results of No. 107 and Nos. 166 to 168 (evaluation results with respect to a solder of Sn-3.5% of Ag by mass-0.8% of Cu by mass-0.06% of Co by mass-Fe). FIG. 7 is a graph showing the evaluation results of relationships between the Co content and the Fe content when the Ag content is fixed at 3.5% by mass and the Cu content is fixed at 0.8% by mass. That is to say, FIG. 7 shows the evaluation results of Nos. 104 to 108 and Nos. 163 to 171.

Figure 8A:
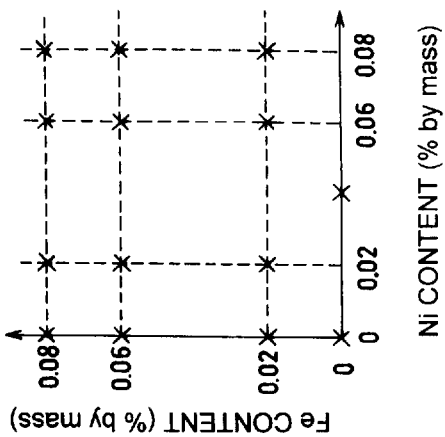
FIGS. 8A to 8C are graphs of Sn—Ag—Cu—Co—Ni—Fe showing the relationship between the Ni content and the Fe content when the Ag content is fixed at 3.5% by mass, the Cu content is fixed at 0.8% by mass and the Co content is varied.
Figure 8B:
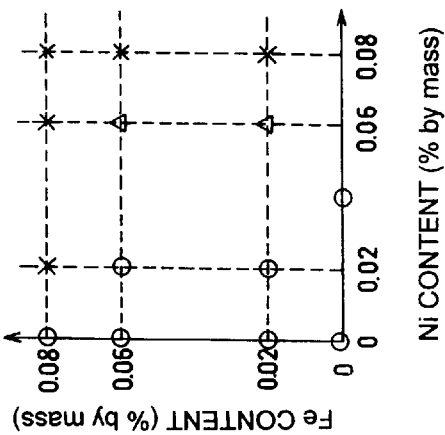
Figure 8C:
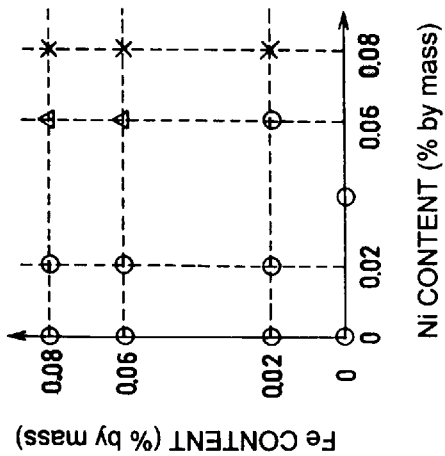

FIGS. 8A, 8B and 8C are graphs showing evaluation results of relationships between the Ni content and the Fe content when the Ag content is fixed at 3.5% by mass, the Cu content is fixed at 0.8% by mass and the Co content is varied. FIG. 8A is a graph showing the evaluation result when the Co content is 0.02% by mass, FIG. 8B is a graph showing the evaluation result when the Co content is 0.06% by mass and FIG. 8C is a graph showing the evaluation result when the Co content is 0.08% by mass. That is to say, FIG. 8A shows the evaluation results of No. 105, No. 112, Nos. 163 to 165 and Nos. 172 to 180, FIG. 8B shows the evaluation results of No. 107, No. 114, Nos. 166 to 168 and Nos. 181 to 189 and FIG. 8C shows the evaluation results of No. 108, No. 115, Nos. 169 to 171 and Nos. 190 to 198.

As shown in FIGS. 2A and 2B, in the case where Co is in a range of 0.02% to 0.06% by mass, excellent results are gained even when the Ag content varies in a range of from 1.0% to 4.0% by mass, which is in the range of the present invention. Similarly, as shown in FIGS. 3A and 3B, in the case where Co is in a range of 0.02% to 0.06% by mass, excellent results are gained even when the Cu content varies in a range of 0.2% to 1.3% by mass, which is in the range of the present invention.

In addition, as shown in FIG. 4 and FIG. 6, in the case where Ni or Fe is contained when the content thereof is 0.06% or less by mass, the liquidus temperature is of a degree wherein the electronic parts and the like are not affected at the time of soldering while in the case where the Ni content exceeds 0.08% by mass, the liquidus temperature exceeds 250° C. so as to be in a range wherein damage is caused to the electronic parts and the like. In the case where Ni is contained, as shown in FIG. 4, the liquidus temperature does not increase at all or increases by an extremely small amount in comparison with a solder not containing Ni having the same content of Ag, Cu and Co, while the melting rate of copper further decreases. In the case where Fe is contained, as shown in FIG. 6, the liquidus temperature lowers further in comparison with the case where Fe is not contained, while the melting rate of copper is controlled to a low rate.

As shown in FIG. 5, Table 21 and the like, in the case where the Co content is in a range of 0.02% to 0.06% by mass and the Ni content is in a range of 0.02% to 0.06% by mass, good results are gained. In particular, in the case where the Co content is in a range of 0.02% to 0.04% by mass and the Ni content is in a range of 0.02% to 0.04% by mass, even better results are gained. Similarly, as shown in FIG. 7, Table 22 and the like, in the case where the Co content is in a range of 0.02% to 0.06% by mass and the Fe content is in a range of 0.02% to 0.06% by mass, good results are gained.

In addition, as shown in FIGS. 8, in the case where Ni and Fe are contained in addition to Co, when the Co content, the Ni content and the Fe content are all in a range of 0.02% to 0.06% by mass, good results are gained.

The effects of adding Co to a solder of Sn-3.5% of Ag by mass-0.8% of Cu by mass, which is a conventional Sn—Ag—Cu based solder, are illustrated in graphs based on the above-described tables. FIG. 9A is a graph showing the relationship between the Co content and the liquidus temperature in the solder of Sn-3.5% of Ag by mass-0.8% of Cu by mass while FIG. 9B is a graph showing the relationship between the Co content and the melting rate of copper in the solder of Sn-3.5% of Ag by mass-0.8% of Cu by mass.

Figure 9B:
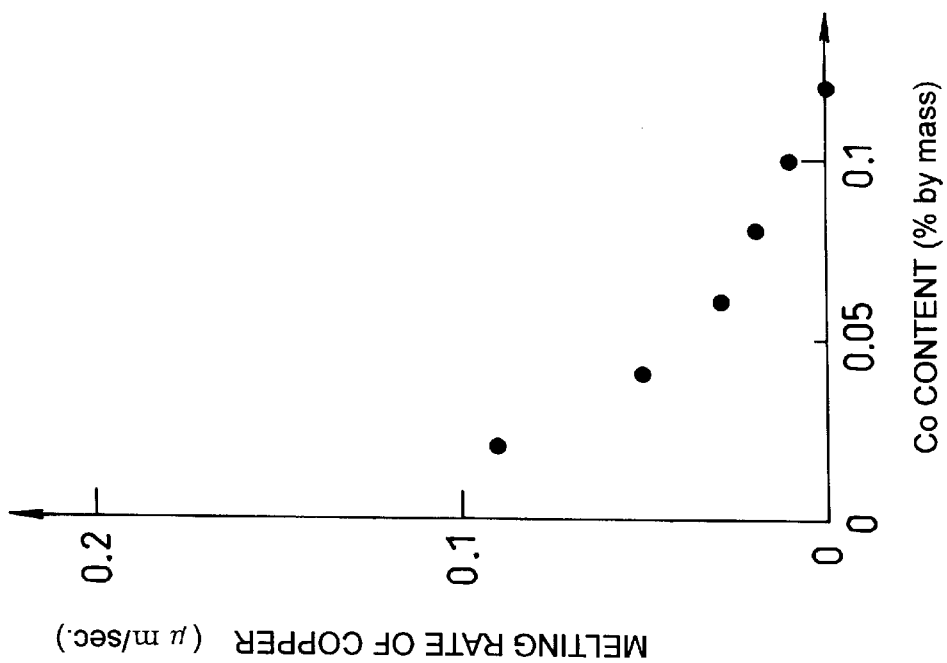
FIG. 9B is a graph of Sn—Ag—Cu—Co showing the relationship between the Co content and the melting rate of copper in the solder of Sn, 3.5% of Ag by mass and 0.8% of Cu by mass.
Figure 9A:
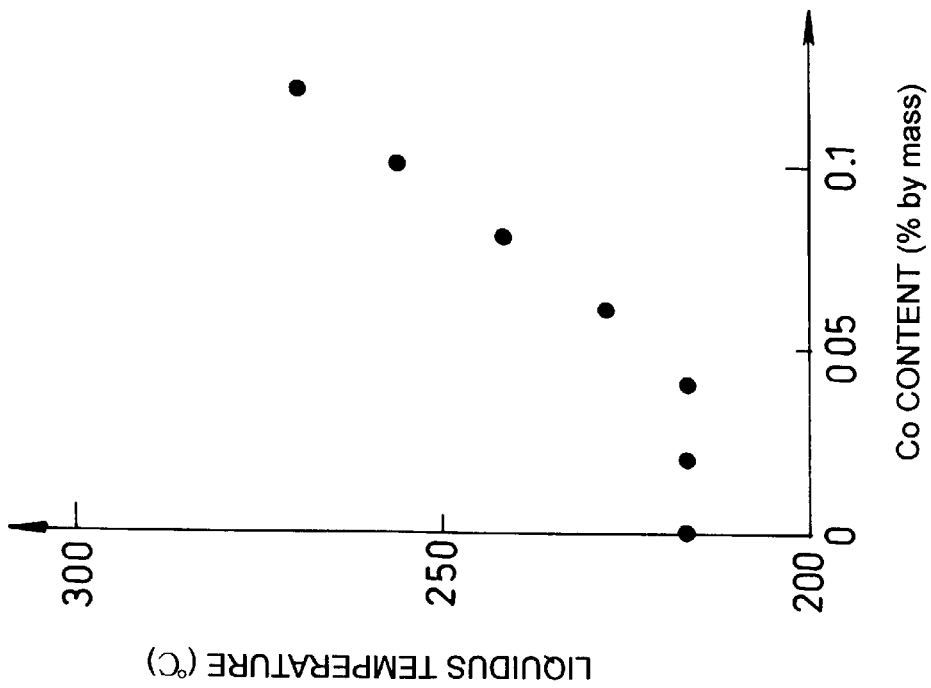

It can also be understood from FIG. 9A and FIG. 9B that in the case where the Co content is in the range of 0.02% to 0.06% by mass, copper consuming can be prevented by reducing the melting rate of copper while controlling the liquidus temperature within a range wherein the printed wiring board, the electronic parts to be mounted and the like are not negatively affected.

What is claimed is:

1. A method for processing a surface of a printed wiring board comprising the step of:

coating a circuit formed on a surface of a printed wiring board with a solder consisting essentially of 1.0% to 4.0% of Ag by mass, 0.2% to 1.3% of Cu by mass, 0.02% to 0.06% of Co by mass, and the remaining of Sn and inevitable impurities, wherein the liquidus temperature of said solder is 240° C. or less, and the melting rate of copper is 0.17 $\mu$m/sec or less.

2. A method for mounting an electronic part comprising the step of:

soldering an electronic part on a circuit formed on a surface of a printed wiring board with a solder consisting essentially of 1.0% to 4.0% of Ag by mass, 0.2% to 1.3% of Cu by mass, 0.02% to 0.06% of Co by mass, and the remaining of Sn and inevitable impurities, wherein the liquidus temperature of said solder is 240° C. or less, and the melting rate of copper is 0.17 $\mu$m/sec or less.

* * * * *